United States Patent
Takizawa et al.

(10) Patent No.: US 10,670,401 B2
(45) Date of Patent: Jun. 2, 2020

(54) GYRO SENSOR, METHOD OF MANUFACTURING GYRO SENSOR, ELECTRONIC APPARATUS, AND VEHICLE

(71) Applicant: Seiko Epson Corporation, Tokyo (JP)

(72) Inventors: Teruo Takizawa, Matsumoto (JP); Takayuki Kikuchi, Suwa (JP)

(73) Assignee: Seiko Epson Corporation (JP)

( * ) Notice: Subject to any disclaimer, the term of this patent is extended or adjusted under 35 U.S.C. 154(b) by 420 days.

(21) Appl. No.: 15/727,033

(22) Filed: Oct. 6, 2017

(65) Prior Publication Data

US 2018/0112982 A1   Apr. 26, 2018

(30) Foreign Application Priority Data

Oct. 26, 2016 (JP) ................... 2016-209991

(51) Int. Cl.
| | |
|---|---|
| *G01C 19/5747* | (2012.01) |
| *G01C 19/5712* | (2012.01) |
| *G01C 19/5762* | (2012.01) |
| *G01C 19/5769* | (2012.01) |
| *G01C 25/00* | (2006.01) |

(52) U.S. Cl.
CPC ..... *G01C 19/5747* (2013.01); *G01C 19/5712* (2013.01); *G01C 19/5762* (2013.01); *G01C 19/5769* (2013.01); *G01C 25/005* (2013.01)

(58) Field of Classification Search
CPC ................ G01C 19/56; G01C 19/5719; G01C 19/5733; G01C 19/5747; G01C 19/5755; G01C 19/5762; G01C 19/5769

USPC .......................... 73/514.01–514.38
See application file for complete search history.

(56) References Cited

U.S. PATENT DOCUMENTS

| | | | |
|---|---|---|---|
| 6,571,630 B1 | 6/2003 | Weinberg et al. | |
| 7,049,165 B2 | 5/2006 | Oguchi | |
| 7,393,714 B2 | 7/2008 | Oguchi | |
| 8,225,658 B2 * | 7/2012 | Leung ................. | B81C 1/00142 |
| | | | 248/573 |
| 9,074,889 B2 | 7/2015 | Tsugai et al. | |
| 2004/0110318 A1 | 6/2004 | Oguchi | |
| 2006/0110843 A1 | 5/2006 | Oguchi | |
| 2007/0180908 A1 | 8/2007 | Seeger et al. | |

(Continued)

FOREIGN PATENT DOCUMENTS

| | | |
|---|---|---|
| JP | 2001-007346 A | 1/2001 |
| JP | 2002-540406 A | 11/2002 |

(Continued)

*Primary Examiner* — Nathaniel J Kolb
(74) *Attorney, Agent, or Firm* — Harness, Dickey & Pierce, P.L.C.

(57) ABSTRACT

A gyro sensor includes: a substrate; a fixed portion that is fixed to the substrate; a driving portion that is driven in a first direction oriented along a first axis; a mass portion that is connected to the driving portion and is displaced in the first direction; and an elastic portion that is connected to the mass portion and the fixed portion. The mass portion includes a detection portion that is displaceable in a second direction oriented along a second axis orthogonal to the first axis by a Coriolis force to act. An outer circumference surface of the elastic portion includes a main surface, a side surface, and a connection surface connecting the main surface to the side surface. The connection surface has a curved surface portion with a curved surface shape.

13 Claims, 24 Drawing Sheets

(56) References Cited

U.S. PATENT DOCUMENTS

| | | | |
|---|---|---|---|
| 2010/0154543 A1* | 6/2010 | Diem | G01C 19/5747 73/504.14 |
| 2011/0132087 A1* | 6/2011 | Ohms | G01C 19/5747 73/504.12 |
| 2013/0127301 A1* | 5/2013 | Osawa | H01L 41/09 310/366 |
| 2013/0192367 A1* | 8/2013 | Osawa | G01P 9/04 73/504.12 |
| 2013/0298670 A1 | 11/2013 | Tsugai et al. | |
| 2013/0320812 A1* | 12/2013 | Yamaguchi | H01L 41/053 310/348 |
| 2014/0020503 A1* | 1/2014 | Yamaguchi | G01P 9/04 74/5 R |
| 2014/0077664 A1* | 3/2014 | Ogura | G01C 19/5712 310/370 |
| 2015/0162522 A1* | 6/2015 | Ogura | G01C 19/5621 310/348 |
| 2015/0212526 A1 | 7/2015 | Kanemoto et al. | |
| 2016/0146605 A1 | 5/2016 | Furuhata | |

FOREIGN PATENT DOCUMENTS

| | | |
|---|---|---|
| JP | 2012-202799 A | 10/2012 |
| JP | 2013-096801 A | 5/2013 |
| JP | 2013-108929 A | 6/2013 |
| JP | 2013-253958 A | 12/2013 |
| JP | 2014-178195 A | 9/2014 |
| JP | 2015-141065 A | 8/2015 |
| JP | 2015-169492 A | 9/2015 |
| JP | 2015-203604 A | 11/2015 |
| JP | 2015-230281 A | 12/2015 |
| JP | 2016-095224 A | 5/2016 |
| JP | 2016-099269 A | 5/2016 |

* cited by examiner

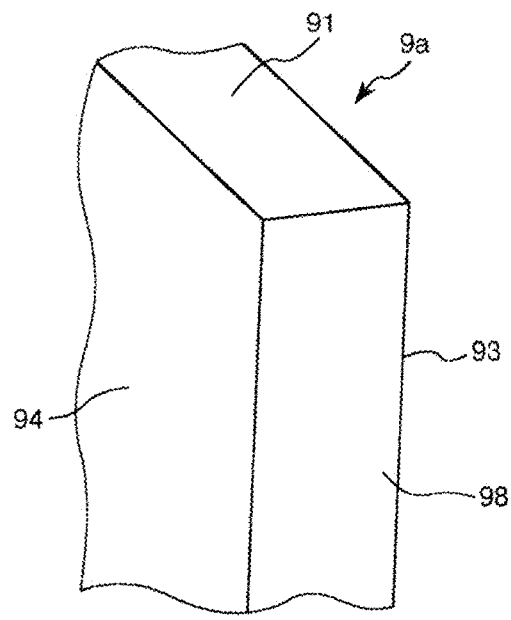
FIG. 8
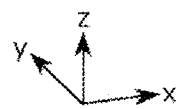
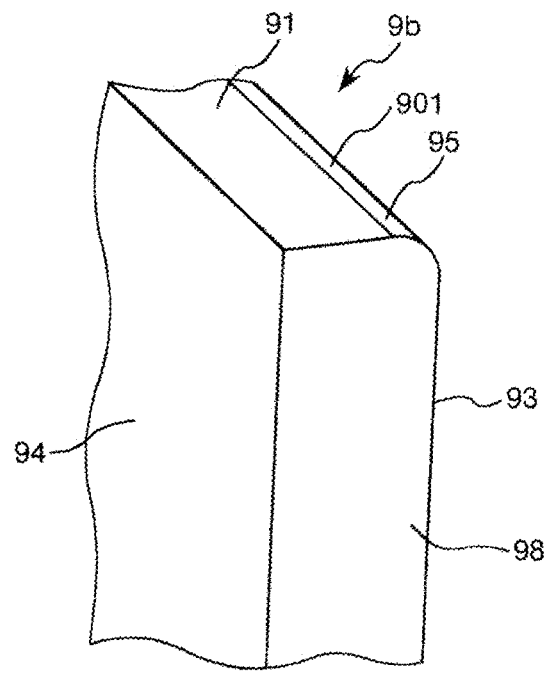
FIG. 9

GYRO SENSOR, METHOD OF MANUFACTURING GYRO SENSOR, ELECTRONIC APPARATUS, AND VEHICLE

BACKGROUND

1. Technical Field

The present invention relates to a gyro sensor, a method of manufacturing the gyro sensor, an electronic apparatus, and a vehicle.

2. Related Art

In recent years, gyro sensor elements using silicon micro electro mechanical system (MEMS) technologies have been developed. Of physical amount sensors, for example, gyro sensors detecting angular velocities have been spread rapidly for motion sensing functions of game devices.

As such a gyro sensor, for example, a sensor element configuring an angular velocity sensor is disclosed in JP-A-2001-7346. The sensor element includes a support substrate, a fixed portion fixed to the support substrate, a vibrator supported by the fixed portion via a support beam, a combteeth-shaped movable electrode provided in the vibrator, and a fixed combteeth electrode engaging with the movable electrode via a gap. In the angular velocity sensor having this configuration, the vibrator vibrates in the X axis direction by an electrostatic force generated between the movable electrode and the fixed combteeth electrode (driving vibration) when a voltage is applied to the fixed combteeth electrode. In this vibration state, when an angular velocity around the Z axis (or the Y axis) is applied, the vibrator vibrates in the Y axis (or the Z axis) direction by a Coriolis force (detecting vibration). By detecting an electric signal corresponding to the magnitude of a vibration amplitude of the vibrator in the Y axis (or the Z axis) direction by the Coriolis force, it is possible to detect an angular velocity of rotation.

The sensor element disclosed in JP-A-2001-7346 is manufactured by dry etching.

However, the cross-sectional shape of the support beam which is, for example, ideally a rectangle may not be an ideal shape due to a machining error, but may be a parallelogram or a trapezoid. Therefore, the driving vibration of the vibrator may include not only a vibration component in the X axis direction which is a desired driving vibration direction but also a vibration component in the Y axis direction or the Z axis direction.

Thus, a quadrature signal which is a type of unnecessary signal may increase and a detected signal may be affected. As a result, there is a problem that detection precision may deteriorate.

SUMMARY

An advantage of some aspects of the invention is that it provides a gyro sensor capable of reducing an increase in a quadrature signal and a method of manufacturing the gyro sensor and provides an electronic apparatus and a vehicle including the gyro sensor.

The advantage can be achieved by the following configurations.

A gyro sensor according to an aspect of the invention includes: a substrate; a fixed portion that is fixed to the substrate; a driving portion that is driven in a first direction oriented along a first axis; a mass portion that is connected to the driving portion and is displaced in the first direction; and an elastic portion that is connected to the mass portion and the fixed portion. The mass portion includes a detection portion that is displaceable in a second direction oriented along a second axis orthogonal to the first axis by a Coriolis force to act. An outer circumference surface of the elastic portion includes a main surface, a side surface, and a connection surface connecting the main surface to the side surface. The connection surface has a curved surface portion with a curved surface shape.

In the gyro sensor according to the aspect of the invention, for example, the connection surface includes the curved surface portion, and thus an increase in a quadrature signal can be reduced even when the shape of the elastic portion in a sectional view of the elastic portion is an asymmetric shape (for example, a parallelogram shape or a trapezoid which is a shape other than a rectangle). Therefore, it is possible to reduce deterioration in detection precision.

In the gyro sensor according to the aspect of the invention, it is preferable that the elastic portion includes a portion extending in a direction intersecting both of the first and second axes, and in a sectional view parallel to both of the first and second axes, an angle formed by an extension line oriented along the main surface connected by the connection surface of the portion and an extension line oriented along the side surface is less than 90°.

With this configuration, even when the shape of the elastic portion in the sectional view is an asymmetric shape, it is possible to more prominently exert the advantage of reducing the increase in the quadrature signal.

In the gyro sensor according to the aspect of the invention, it is preferable that the connection surface is configured by the curved surface portion.

With this configuration, it is possible to more prominently exert the advantage of reducing the increase in the quadrature signal.

In the gyro sensor according to the aspect of the invention, it is preferable that the connection surface includes a plurality of the curved surface portions, and the plurality of curved surface portions are separated from each other.

With this configuration, it is possible to exert the advantage of reducing the increase in the quadrature signal to the same degree as the configuration in which the entire region of the connection surface is the curved surface portion.

In the gyro sensor according to the aspect of the invention, it is preferable that the connection surface is provided on a side of the substrate of the elastic portion.

With this configuration, it is possible to further reduce the increase in the quadrature signal. For example, when the substrate has transmittance, the connection surface including the curved surface portion on the substrate side of the elastic portion can be formed by radiating a laser from the substrate side even when the elastic portion is disposed on the upper side of the substrate.

In the gyro sensor according to the aspect of the invention, it is preferable that the outer circumference surface of the elastic portion includes first and second main surfaces serving as the main surface, first and second side surfaces serving as the side surface, a first connection surface connecting the first main surface to the first side surface and serving as the connection surface, and a second connection surface connecting the second main surface to the second side surface and serving as the connection surface.

With this configuration, it is possible to more prominently exert the advantage of reducing the increase in the quadrature signal.

In the gyro sensor according to the aspect of the invention, it is preferable that the outer circumference surface of the elastic portion is located on an opposite side of the main surface to the connection surface and includes a surface connected to the main surface, and at least a part of the surface has a curved surface of which a radius of curvature is less than a radius of curvature of the curved surface portion of the connection surface.

With this configuration, it is possible to reduce the increase in the quadrature signal because of a considerably large radius of curvature of the curved surface portion.

A method of manufacturing a gyro sensor according to an aspect of the invention includes: preparing a substrate; forming a fixed portion fixed to the substrate, a driving portion driven in a first direction oriented along a first axis, a detection portion displaceable in a second direction oriented along a second axis orthogonal to the first axis by a Coriolis force acting on the driving portion, a mass portion connecting the driving portion to the fixed portion, and an elastic portion including a main surface and a side surface and connected to the mass portion and the fixed portion; and processing the elastic portion. In the processing of the elastic portion, a connection surface connecting the main surface to the side surface and including a curved surface portion with a curved surface shape is formed by radiating a laser beam to at least a part of the elastic portion.

In the method of manufacturing the gyro sensor according to the aspect of the invention, it is possible to form the curved surface portion at least in a part of the connection surface simply and with high precision. Therefore, it is possible to simply manufacture the gyro sensor capable of reducing the increase in the quadrature signal.

In the method of manufacturing the gyro sensor according to the aspect of the invention, it is preferable that, in the processing of the elastic portion, a quadrature signal is measured.

With this configuration, for example, by forming the curved surface portion based on the measured (detected) quadrature signal, it is possible to obtain the gyro sensor capable of reducing the increase in the quadrature signal with higher precision.

In the method of manufacturing the gyro sensor according to the aspect of the invention, it is preferable that, in the processing of the elastic portion, a processing amount of the elastic portion is adjusted based on a measurement result of the quadrature signal.

With this configuration, it is possible to form the curved surface portion capable of appropriately exerting the advantage of reducing the increase in the quadrature signal with higher precision.

An electronic apparatus according to an aspect of the invention includes the gyro sensor according to the aspect of the invention.

With this configuration, it is possible to reduce the increase in the quadrature signal. Since the gyro sensor of which deterioration in the detection precision is reduced is included, the electronic apparatus with high reliability can be obtained.

A vehicle according to an aspect of the invention includes the gyro sensor according to the aspect of the invention.

With this configuration, it is possible to reduce the increase in the quadrature signal. Since the gyro sensor of which deterioration in the detection precision is reduced is included, the vehicle with high reliability can be obtained.

BRIEF DESCRIPTION OF THE DRAWINGS

The invention will be described with reference to the accompanying drawings, wherein like numbers reference like elements.

FIG. 8 is an enlarged perspective view illustrating a model of an elastic portion with no curved surface portion used in the simulation.

FIG. 9 is an enlarged perspective view illustrating a model of an elastic portion with a curved surface portion used in the simulation.

DESCRIPTION OF EXEMPLARY EMBODIMENTS

Hereinafter, a gyro sensor, a method of manufacturing the gyro sensor, an electronic apparatus, and a vehicle according to the invention will be described in detail according to the embodiments described in the appended drawings.

1. Gyro Sensor and Method of Manufacturing Gyro Sensor

First Embodiment

Figure 1:
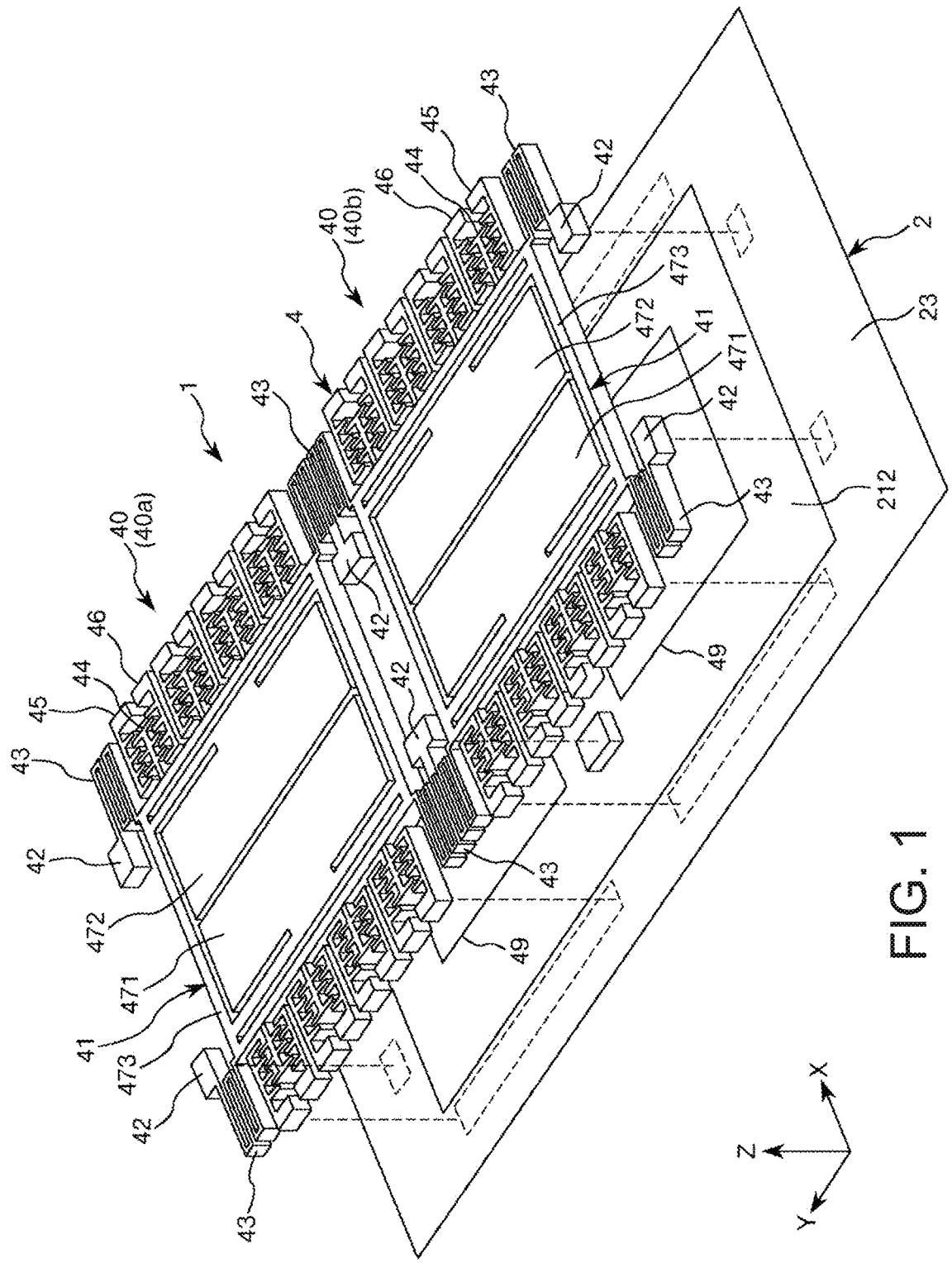
FIG. 1 is a perspective view illustrating a gyro sensor according to a first embodiment of the invention.
Figure 2:
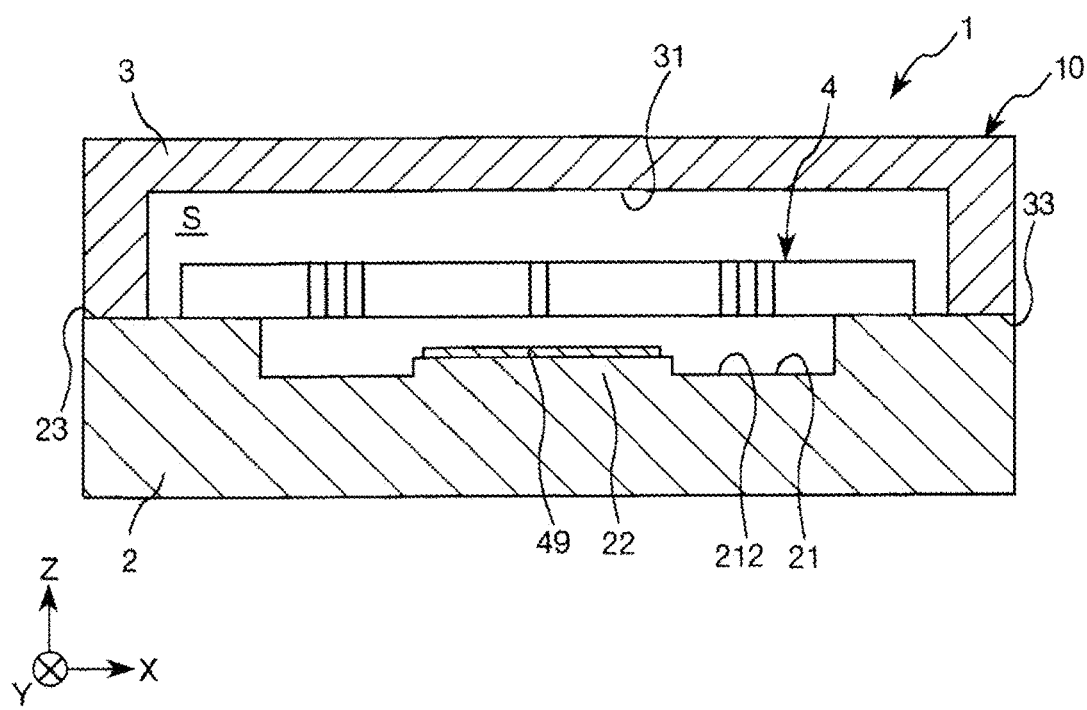
FIG. 2 is a sectional view illustrating the gyro sensor illustrated in FIG. 1.
Figure 3:
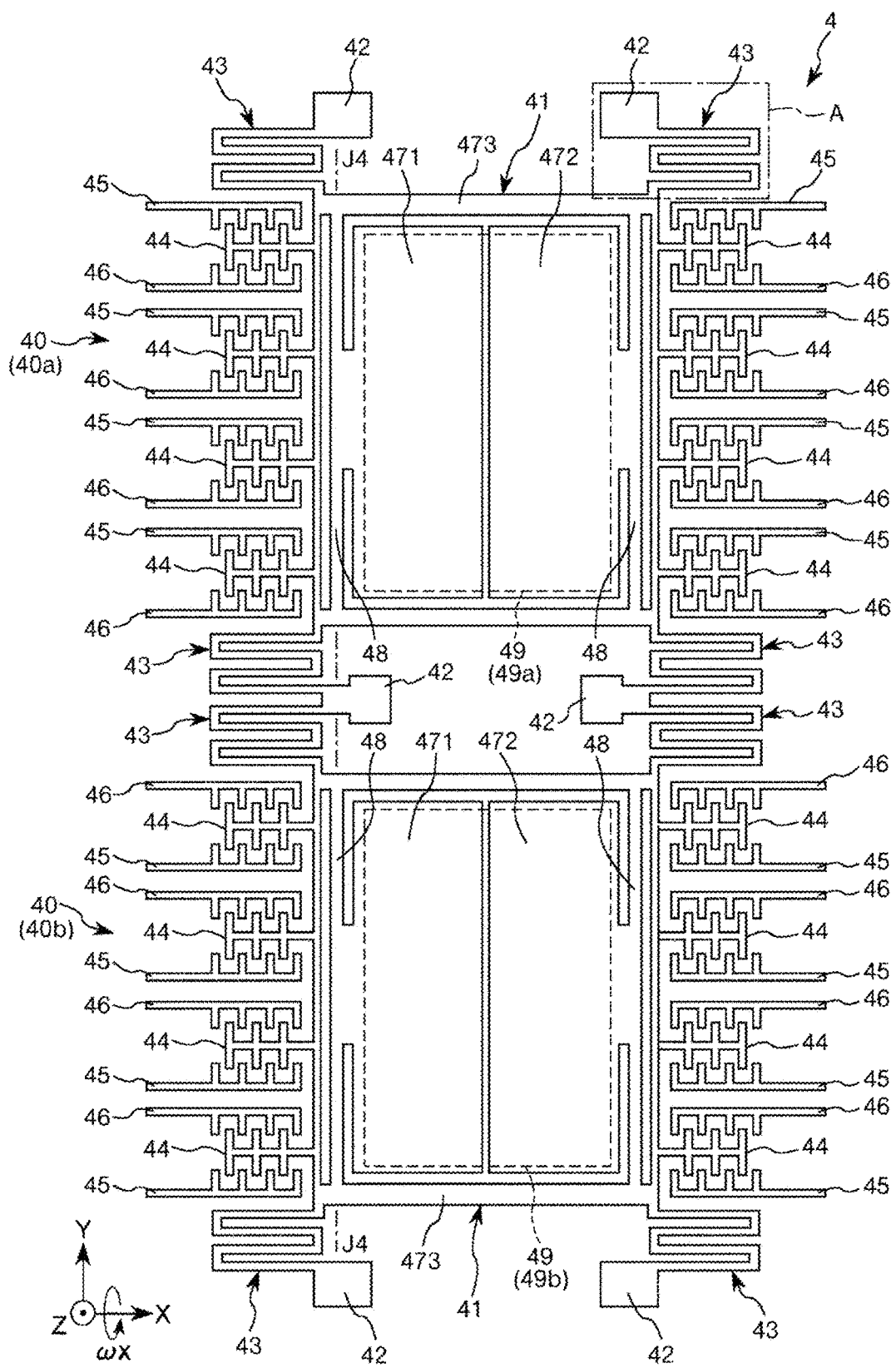
FIG. 3 is a plan view illustrating the gyro sensor element illustrated in FIG. 1.

FIG. 1 is a perspective view illustrating a gyro sensor according to a first embodiment of the invention. FIG. 2 is a sectional view illustrating the gyro sensor illustrated in FIG. 1. FIG. 3 is a plan view illustrating the gyro sensor element illustrated in FIG. 1. In FIG. 1, a substrate (base) is schematically illustrated and a cover member is not illustrated. In the following description, three axes orthogonal to each other are referred to as the X axis (a third axis), the Y axis (a first axis), and the Z axis (a second axis). A direction oriented along the X axis is referred to as an "X axis direction", a direction oriented along the Y axis is referred to as a "Y axis direction", and a direction oriented along the Z axis is referred to as a "Z axis direction". In each drawing, to facilitate the description, the dimensions of each portion are appropriately exaggerated in the drawings as necessary and dimension ratios between portions do not necessarily match actual dimension ratios.

Gyro Sensor

A gyro sensor 1 illustrated in FIG. 1 is an angular velocity sensor capable of detecting an angular velocity around the X axis. As illustrated in FIG. 2, the gyro sensor 1 includes a gyro sensor element 4 and a package 10 that accommodates the gyro sensor element 4.

Package

The package 10 includes a substrate 2 (base) that supports the gyro sensor element 4 and a lid member 3 that is bonded to the substrate 2. A space S in which the gyro sensor element 4 is accommodated is formed between the substrate 2 and the lid member 3.

The substrate 2 and the lid member 3 each have a plate shape and are disposed along an XY plane (reference plane) which is a plane including the X and Y axes.

A depression 21 opened to the upper side (the side of the gyro sensor element 4) is formed in the substrate 2. A protrusion 22 protruding from a bottom surface 212 of the depression 21 is formed in the middle of the depression 21. Parts (fixed portions 42 and fixed driving portions 45 and 46 to be described below) of the gyro sensor element 4 are fixed to an upper surface 23 except for the depression 21 of the substrate 2.

A depression 31 opened to the lower side (the side of the substrate 2) is formed in the lid member 3. The lid member 3 is provided on the substrate 2 to cover the gyro sensor element 4 contactlessly and a lower surface 33 except for the depression 31 is bonded to the upper surface 23 of the substrate 2.

The space S is an airtight space formed by the depressions 21 and 31 and is in a depressurized state (for example, about $1\times10^{+2}$ to $1\times10^{-2}$ Pa). Thus, it is possible to improve detection sensitivity of an angular velocity.

A material of which the substrate 2 is formed is not particularly limited, but a material with an insulation property is preferably used. Specifically, a silicon material with high resistance or a glass material is preferably used. For example, a glass material containing a given amount of alkali metal ions (mobile ions) (for example, borosilicate glass such as Pyrex glass (registered trademark)) is preferably used. Thus, when the gyro sensor element 4 is formed of silicon as a main material, anodic bonding of the substrate 2 and the gyro sensor element 4 can be performed. Additionally, a quartz substrate, a crystal substrate, or a silicon on insulator (SOI) substrate may be used.

A material of which the lid member 3 is formed is not particularly limited. For example, the same material as the above-described substrate 2 can be used.

A method of bonding the substrate 2 and the lid member 3 differs depending on the materials of which the substrate 2 and the lid member 3 are formed and is not particularly limited. For example, a bonding method using a bonding material such as an adhesive or a brazing material or a solid bonding method such as direct bonding or anodic bonding can be used.

Gyro Sensor Element

The gyro sensor element 4 illustrated in FIG. 3 includes two structures 40 (40a and 40b) and two fixed detection portions 49 (49a and 49b) lined up in the Y axis direction. The two structures 40a and 40b are configured to be vertically symmetric and have the same configuration in FIG. 3.

Each structure 40 includes a mass portion 41, a plurality of fixed portions 42, a plurality of elastic portions 43, a plurality of driving portions 44 (movable driving electrodes), a plurality of fixed driving portions 45 and 46 (fixed driving electrodes), detection portions 471 and 472 (movable detection electrodes), and a plurality of beam portions 48. The mass portion 41 includes the driving portions 44, a frame 473, the detection portions 471 and 472, and the beam portions 48 and is integrally formed. That is, the detection portions 471 and 472 are included in the mass portion 41.

The external shape of the mass portion 41 is a quadrangular frame shape in a plan view when viewed in the Z axis direction (hereinafter simply referred to as a "plan view") and contains the driving portions 44, the frame 473, and the detection portions 471 and 472, as described above. Specifically, the external shape of the mass portion 41 is configured to include one pair of portions which extend in parallel in the Y axis direction and of which ends are connected to each other and one pair of portions which extend in parallel in the X axis direction.

Four fixed portions 42 are formed in one structure 40. Each fixed portion 42 is fixed to the upper surface 23 of the above-described substrate 2. Each fixed portion 42 is disposed outside of the mass portion 41 in the plan view and is disposed at positions corresponding to each corner of the mass portion 41 in the embodiment. As illustrated, the fixed portion 42 located on the −Y axis side of the structure 40a and the fixed portion 42 located on the +Y axis side of the structure 40b are used as common fixed portions.

In the embodiment, four elastic portions 43 are formed in one structure 40. Each elastic portion 43 connects a part of the mass portion 41 to the fixed portion 42 in the plan view. In the embodiment, the elastic portions 43 are connected to corners of the frame 473 of the mass portion 41, but the invention is not limited thereto. The elastic portions 43 may be formed at positions at which the mass portion 41 is displaceable with respect to the fixed portions 42. In FIG. 3, the mass portion 41 is configured to be displaceable in the Y axis direction. As illustrated, each elastic portion 43 is formed in a meandering shape in the plan view and includes a first portion 4301 extending in the X axis direction and a second portion 4302 extending in the Y axis direction (see FIG. 4). The shape of the driving portion 44 is not limited to the illustrated shape as long as the driving portion 44 is elastically deformable in a desired driving direction (the Y axis direction in the embodiment).

Eight driving portions 44 are formed in one structure 40. Each driving portion 44 is connected to a portion of the mass portion 41 extending in the Y axis direction. Specifically, four driving portions 44 are located on the +X side of the mass portion 41 and the four remaining driving portions 44 are located on the −X side of the mass portion 41. Each driving portion 44 is formed in a combteeth shape including a trunk portion extending from the mass portion 41 in the X axis direction and a plurality of branch portions extending from the trunk portion in the Y axis direction.

Eight fixed driving portions 45 and 46 are formed in one structure 40. The fixed driving portions 45 and 46 are fixed to the upper surface 23 of the above-described substrate 2. The fixed driving portions 45 and 46 are formed in a combteeth shape corresponding to the driving portions 44 and are formed to interpose the driving portion 44.

The detection portions 471 and 472 are plate-shaped members of which shapes in the plan view are quadrangular, are disposed inside the mass portion 41, and are connected to the mass portion 41 by the beam portions 48. The detection portions 471 and 472 are each rotatable (displaceable) about a rotation axis J4.

The fixed detection portions 49 (fixed detection electrodes) are formed on the protrusion 22 located inside the depression 21 of the substrate 2 (see FIG. 2). The fixed detection portions 49 are formed in a quadrangle shape in the plan view and face the detection portions 471 and 472. The fixed detection portions 49 are separated from the detection portions 471 and 472.

The mass portion 41, the elastic portions 43, the driving portions 44, parts of the fixed driving portions 45, parts of the fixed driving portions 46, the detection portions 471 and 472, and the beam portions 48 of the above-described configuration are formed on the upper side of the depression 21 of the substrate 2 and are separated from the substrate 2.

The above-described structure 40 is integrally formed by patterning a conductive silicon substrate, in which impurities such as phosphorus or boron are doped, by etching.

As a material of which the fixed detection portions 49 are formed, for example, aluminum, gold, platinum, indium tin oxide (ITO), or zinc oxide (ZnO) can be used.

Although not illustrated, the fixed portions 42, the fixed driving portions 45, the fixed driving portions 46, the fixed detection portions 49a, and the fixed detection portion 49b are electrically connected to wirings and terminals (not illustrated). The wirings and the terminals are formed on the substrate 2, for example.

The configuration of the gyro sensor 1 has been described simply above. The gyro sensor 1 having the configuration can detect an angular velocity ωx as follows.

First, when a driving voltage is applied between the fixed driving portions 45 and 46 and the driving portions 44 included in the gyro sensor 1, an electrostatic attraction force of which a strength is periodically changed is generated between the driving portions 44 and the fixed driving portions 45 and 46. Thus, with elastic deformation of the elastic portions 43, the driving portions 44 vibrate in the Y axis direction. At this time, the plurality of driving portions 44 included in the structure 40a and the plurality of driving portions 44 included in the structure 40b vibrate at opposite phases in the Y axis direction (driving vibration).

When the angular velocity ωx is applied to the gyro sensor 1 in a state in which the driving portions 44 vibrate in the Y axis direction, the Coriolis force is operated and the detection portions 471 and 472 are displaced about the rotation axis J4. At this time, the detection portions 471 and 472 included in the structure 40a and the detection portions 471 and 472 included in the structure 40b are displaced in opposite directions. For example, when the detection portions 471 and 472 included in the structure 40a are displaced in the +Z axis direction, the detection portions 471 and 472 included in the structure 40b are displaced in the −Z axis direction. Conversely, when the detection portions 471 and 472 included in the structure 40a are displaced in the −Z axis direction, the detection portions 471 and 472 included in the structure 40b are displaced in the +Z axis direction.

In this way, when the detection portions 471 and 472 are displaced (detecting vibration), distances between the detection portions 471 and 472 and the fixed detection portions 49 are changed. Electrostatic capacitance between the detection portions 471 and 472 and the fixed detection portions 49 is changed with the change in the distances. Then, the angular velocity ωx added to the gyro sensor 1 can be detected based on a change amount of electrostatic capacitance.

As described above, when the driving portions 44 vibrate in the Y axis direction (driving vibration), it is ideal that the driving portions 44 preferably vibrate in nearly parallel to the Y axis direction from the time of the non-driving state. However, the shape of the gyro sensor element 4 and particularly the shape of the elastic portion 43 is not an ideal shape due to a machining error or the like. Therefore, a so-called quadrature signal may increase in which the vibration of the driving portion 44 connected to the elastic portion 43 via the mass portion 41 includes not only a vibration component in the Y axis direction which is a desired driving vibration direction but also a vibration component in the X axis direction or the Z axis direction (an unnecessary vibration component) which is another vibration direction.

In the embodiment, the elastic portion 43 has characteristics in which the increase in the quadrature signal is reduced. Hereinafter, the elastic portion 43 will be described in detail.

Elastic Portion

Figure 4:
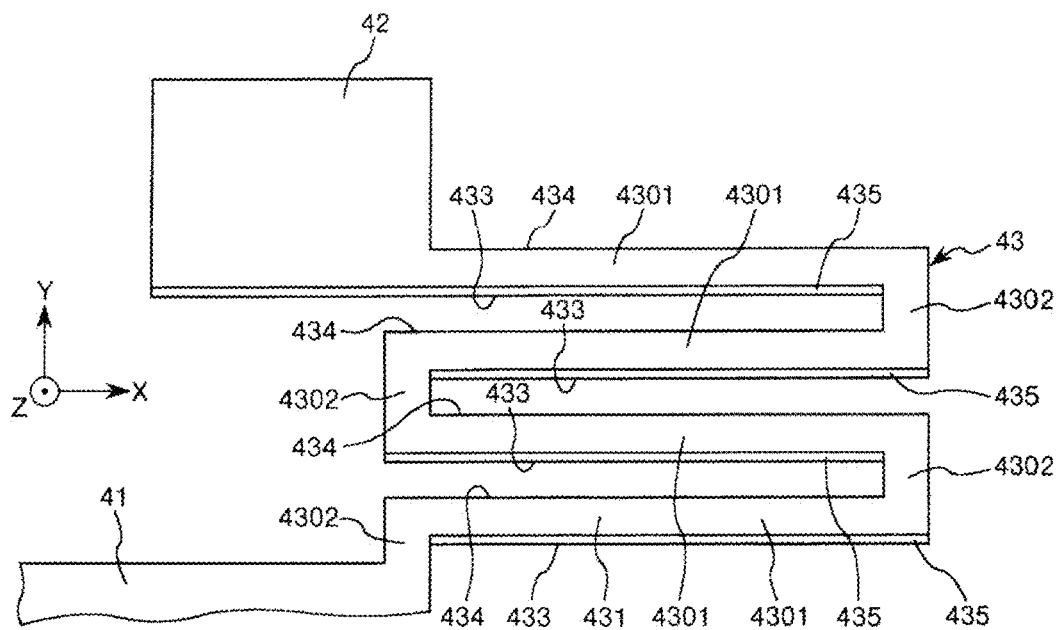
FIG. 4 is a plan view schematically illustrating a part of an elastic portion illustrated in FIG. 3.
Figure 5:
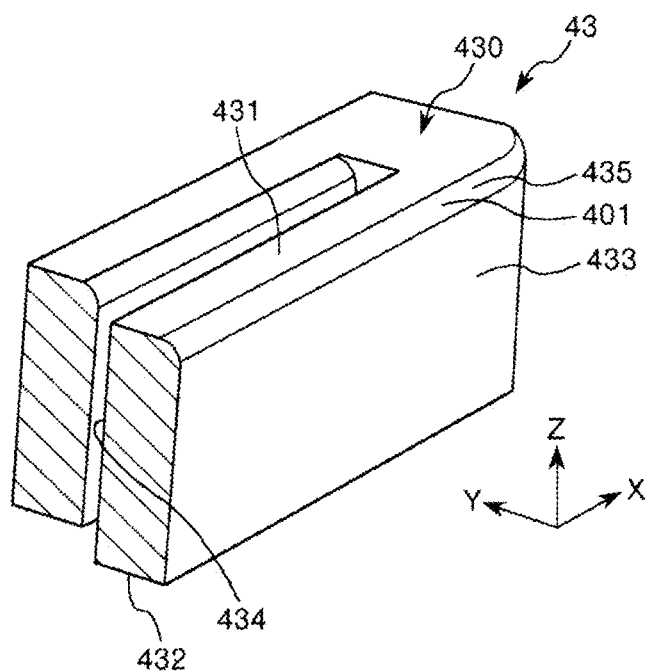
FIG. 5 is a perspective view schematically illustrating a part of the elastic portion illustrated in FIG. 4.
Figure 6:
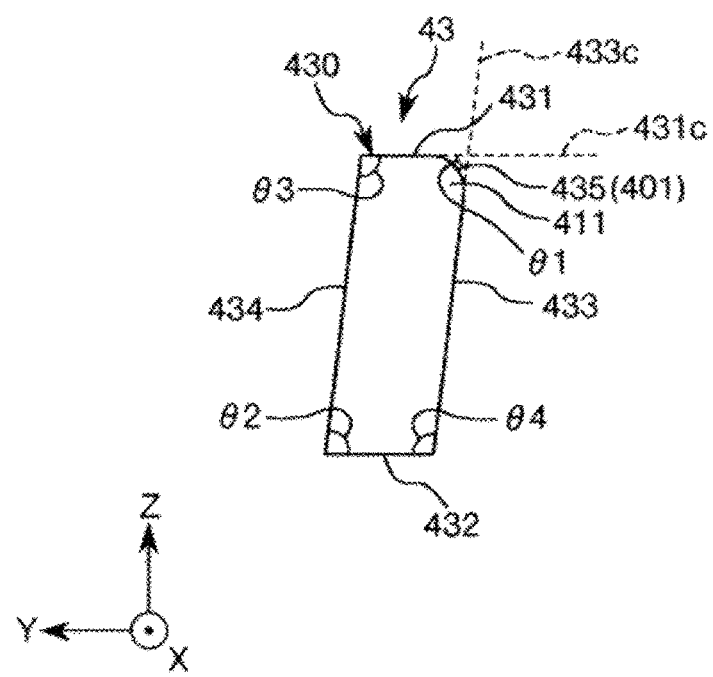
FIG. 6 is a cross-sectional diagram illustrating the elastic portion illustrated in FIG. 4.

FIG. 4 is a plan view schematically illustrating a part of the elastic portion illustrated in FIG. 3. FIG. 5 is a perspective view schematically illustrating a part of the elastic portion illustrated in FIG. 4. FIG. 6 is a cross-sectional diagram illustrating the elastic portion illustrated in FIG. 4.

The elastic portion 43 in a region A surrounded by a one-dot chain line illustrated in FIG. 3 is illustrated as a representative in FIG. 4.

As illustrated in FIG. 4, the elastic portion 43 is formed in a meandering shape in the plan view and includes a plurality of first portions 4301 extending in the X axis direction and having a rectangular shape and a plurality of second portions 4302 extending in the Y axis direction. The first portion 4301 is longer than the second portion 4302. One end of the elastic portion 43 is connected to the mass portion 41 and the other end of the elastic portion 43 is connected to the fixed portion 42.

As illustrated in FIGS. 5 and 6, the elastic portion 43 in a sectional view in the Y axis direction (a cross-sectional shape parallel to the YZ plane which is a plane including the Y and Z axes) is formed in a nearly parallelogram shape. An outer circumference surface 430 of the elastic portion 43 includes a first main surface 431 and a second main surface 432 as one pair of main surfaces and a first side surface 433 and a second side surface 434 as one pair of side surfaces, and a connection surface 435.

The first main surface 431 and the second main surface 432 are flat surfaces along the XY plane which is a plane including the X and Y axes. The first main surface 431 is a surface on the +Z axis side and the second main surface 432 is a surface on the −Z axis side. In the embodiment, each of the first main surface 431 and the second main surface 432 is in a meandering shape and includes a portion extending in the X axis direction and a portion extending in the Y axis direction.

The first side surface 433 is a surface on the −Y axis side and the second side surface 434 is a surface on the +Y axis side. In the embodiment, four first side surfaces 433 and four second side surfaces 434 are formed in one elastic portion 43 (see FIG. 4). As illustrated in FIGS. 5 and 6, each of the first side surface 433 and the second side surface 434 is a flat surface inclined with respect to the XZ plane which is a plane including the X and Z axes. Specifically, for example, when an angle (inclination angle) formed between the first side surface 433 and the XZ plane deviates from an ideal shape due to a machining error and is viewed at a flexure θ1, the angle (inclination angle) is in a range of about 0°<θ1<3° (or −3°<θ1<0°). Similarly, for the second side surface 434, the angle is in the range of about −3°<θ1<0° (or 0°<θ1<3°). The side of the first side surface 433 on the +Z axis side is connected to the connection surface 435 and the side of the first side surface 433 on the −Z axis side is connected to the second main surface 432. On the other hand, the side of the second side surface 434 on the +Z axis side is connected to the first main surface 431 and the side of the second side surface 434 on the −Z axis side is connected to the second main surface 432.

The connection surface 435 connects the side of the first main surface 431 on the −Y axis side to the side of the first side surface 433 on the +Z axis side. As illustrated in FIG. 5, the connection surface 435 includes a curved surface portion 401 which is a curved surface with a convex shape. In other words, the curved surface portion 401 can be said to be a chamfered surface and a surface with a curvature. In the embodiment, the connection surface 435 is entirely configured as the curved surface portion 401, but may be configured partially as the curved surface portion 401 rather than the entire surface. The radius of curvature of the curved surface portion 401 is appropriately set in accordance with the configuration, the shape, or the like of the elastic portion 43 and is not particularly limited. For example, the radius of curvature is equal to or greater than about 0.1 μm and equal to or less than about 20 μm.

The cross-sectional shape of the elastic portion 43 including the outer circumference surface 430 is a nearly parallelogram shape, as described above. In the embodiment, an angle θ1 formed between an imaginary surface 431c extending from the first main surface 431 and an imaginary surface 433c extending from the first side surface 433 is less than 90°. That is, the angle θ1 is an acute angle. An angle θ2 between the second main surface 432 and the second side surface 434 is an acute angle. On the other hand, an angle θ3 between the first main surface 431 and the second side surface 434 and angle θ4 formed between the second main surface 432 and the first side surface 433 are greater than 90°. That is, the angles θ3 and θ4 are obtuse angles.

Here, as described above, the gyro sensor 1 which is an example of the gyro sensor according to the invention includes a substrate 2, the fixed portions 42 that are fixed to the substrate 2, the driving portions 44 that are driven in the first direction oriented along the Y axis serving as the "first axis," the detection portions 471 and 472 that are displaceable in the second direction oriented along the Z axis serving as the "second axis" orthogonal to the Y axis by the Coriolis force operated on the driving portions 44, the mass portion 41 that connects the driving portions 44 to the fixed portions 42, and the elastic portions 43 that connect the mass portion 41 to the fixed portions 42. The outer circumference surface 430 of the elastic portion 43 includes the first main surface 431 and the second main surface 432 serving as the "main surfaces", the first side surface 433 and the second side surface 434 serving as the "side surfaces", and the connection surface 435 connecting the first main surface 431 to the first side surface 433. The connection surface 435 includes the curved surface portion 401 with the curved surface shape. In the gyro sensor 1, the connection surface 435 including the curved surface portion 401 is included, and thus an increase in a quadrature signal can be reduced even when the shape of the elastic portion 43 in the sectional view when viewed from the X axis direction is the nearly parallelogram shape as in the embodiment or an asymmetric shape such as a trapezoid. Therefore, it is possible to reduce deterioration in detection precision.

In particular, in the gyro sensor element 4, the elastic portion 43 is a portion connected to the fixed portion 42 fixed to the substrate 2 and does not have an ideal shape due to a machining error. Thus, vibration including a component other than a driving vibration component easily occurs. Therefore, the configuration of the elastic portion 43 that includes the connection surface 435 including the curved surface portion 401 is particularly effective in a reduction in the increase in the quadrature signal in the gyro sensor 1. This is because the elastic portion 43 determines a direction of the driving amplitude and the deviation in the ideal shape of the elastic portion 43 is a main cause for generating a quadrature signal. Accordingly, processing the elastic portion 43 connected to the fixed portion 42 as in the embodiment is effective in a suppression of the quadrature signal. In the embodiment, since the elastic portion 43 displaced by vibration of the driving portion 44 and the beam portion 48 displaced in accordance with the Coriolis force without relative displacement to the vibration of the driving portion 44 are included, an influence of the processing of the elastic portion 43 on the beam portion 48 is small. The beam portion 48 may be displaceable in the Z axis direction and may be, for example, a torsion spring, a folded spring, or a spring with a thin plate shape in the Z direction.

As described above, the elastic portion 43 includes the first portion 4301 which is a portion extending in the direction (in the embodiment, the X axis) intersecting both of the Y axis serving as the "first axis" and the Z axis serving as the "second axis". In a sectional view parallel to both the Y and Z axes, the angle θ1 between extension lines of the first side surface 433 serving as the "side surface" and the first main surface 431 serving as the "main surface" connected by the connection surface 435 of the first portion 4301 is less than 90°. That is, as described above, the angle θ1 between the imaginary surfaces 431c and 433c is less than 90°. In this way, the connection surface 435 is formed in a portion (vertex portion) in which the angle θ1 is an acute angle. Thus, even when the shape of the elastic portion 43 in the sectional view is an asymmetric shape, it is possible to more prominently exert the advantages of reducing the increase in a quadrature signal.

In the embodiment, the connection surface 435 is configured as the curved surface portion 401. That is, the entire region of the connection surface 435 is formed in a curved surface shape. Thus, it is possible to more prominently exert the advantages of reducing the increase in a quadrature signal.

Next, a reduction in the increase in a quadrature signal by including the connection surface 435 including the curved surface portion 401 in the elastic portion 43 of the gyro sensor 1, as described above, will be described based on the following simulation result.

Figure 7:
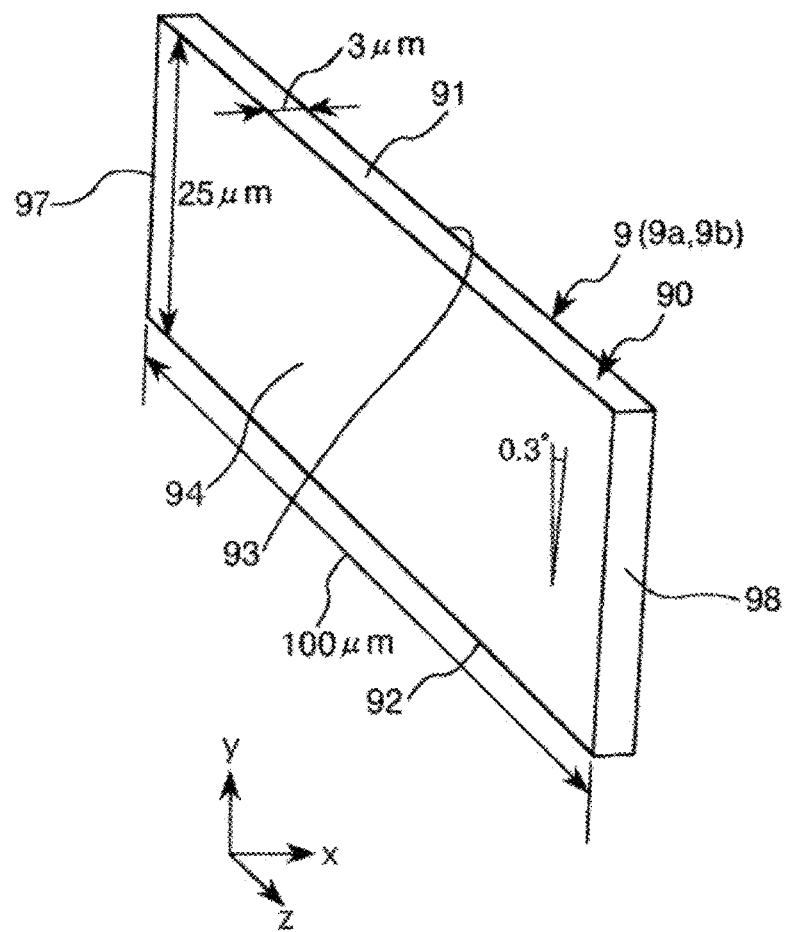
FIG. 7 is a perspective view illustrating a model of an elastic portion used in simulation.
Figure 10:
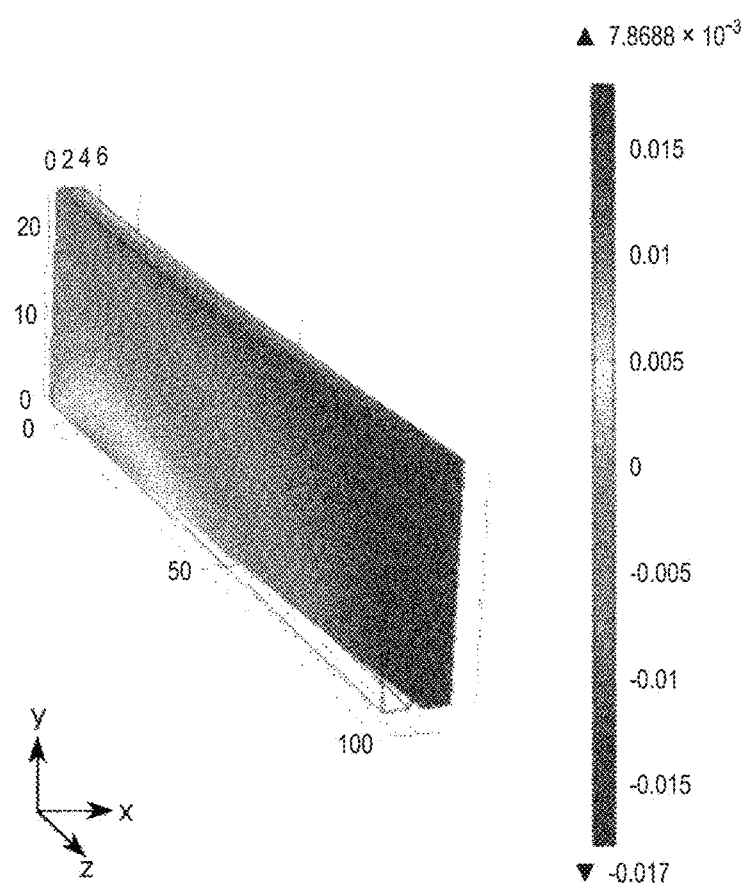
FIG. 10 is a diagram illustrating a distribution of a displacement amount in the y axis direction in the model of the elastic portion illustrated in FIG. 8.
Figure 11:
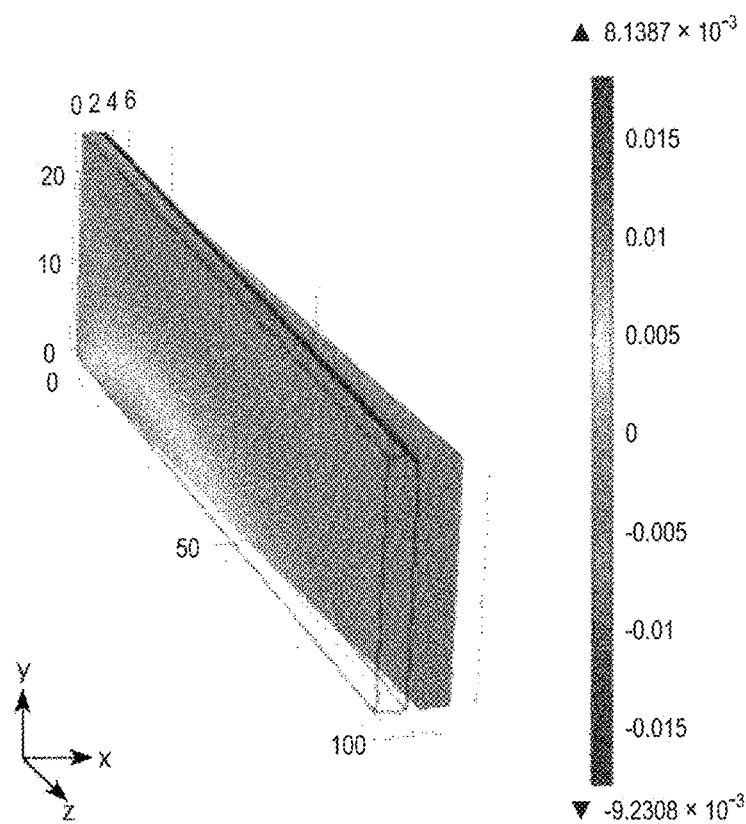
FIG. 11 is a diagram illustrating a distribution of a displacement amount in the y axis direction in the model of the elastic portion illustrated in FIG. 9.

FIG. 7 is a perspective view illustrating a model of an elastic portion used in simulation. FIG. 8 is an enlarged perspective view illustrating a model of the elastic portion with no curved surface portion used in the simulation. FIG. 9 is an enlarged perspective view illustrating a model of the elastic portion with a curved surface portion used in the simulation. FIG. 10 is a diagram illustrating a distribution of a displacement amount in the y axis direction in the model of the elastic portion illustrated in FIG. 8. FIG. 11 is a diagram illustrating a distribution of a displacement amount in the y axis direction in the model of the elastic portion illustrated in FIG. 9. In FIGS. 7 to 11, three axes orthogonal to each other are x, y, and z axes. A direction oriented along the x axis is referred to as an "x axis direction", a direction oriented along the y axis is referred to as a "y axis direction", and a direction oriented along the z axis is referred to as a "z axis direction".

The elastic portion 9 (9a or 9b) formed in a flat plate shape illustrated in FIG. 7 was used as the model used in the simulation. The outer circumference surface 90 of the elastic portion 9 includes a pair of first main surface 91 and second main surface 92, a pair of first side surface 93 and second side surface 94, and a base end surface 97 located on the −Z axis side, and a front end surface 98 located on the +Z axis side. The elastic portion 9 has a width of 3 μm in the x axis direction, a width of 25 μm in the y axis direction, and a width of 100 μm in the z axis direction. The elastic portion 9 has a cross-sectional shape which is nearly parallelogrammic and is inclined at 0.3° with respect to the yz plane which is a plane including the y and z axes.

An elastic portion 9a illustrated in FIG. 8 and an elastic portion 9b illustrated in FIG. 9 were used as the elastic portion 9. The elastic portion 9b includes a connection surface 95 configured as a curved surface portion 901 with a curved surface shape. That is, the elastic portion 9a includes no "curved surface portion" and the elastic portion 9b includes a curved surface portion 901.

By displacing (vibrating) the elastic portions 9 (9a and 9b) having the configuration in the +X axis direction, displacement (vibration) of the elastic portions 9 in the Y axis direction was simulated. Specifically, as illustrated in FIG. 7, displacement of the front end surface 98 in the y axis direction was simulated by using the base end surface 97 of the elastic portion 9 as a connection surface supported by a desired fixed portion (the fixed portion 42 in the above-described elastic portion 43) and displacing the side of the front end surface 98 of the elastic portion 9 in the +x axis direction in a state in which the base end surface 97 was supported by the fixed portion. A displacement amount in the +x axis direction was set to 10 μm.

As illustrated in FIGS. 10 and 11, in each of the elastic portions 9a and 9b, the side of the base end surface 97 is displaced in the +y axis direction and the front end surface 98 is displaced in the −y axis direction. As illustrated in FIGS. 10 and 11, the front end surface 98 of the elastic portion 9a is further displaced in the −y axis direction than the front end surface 98 of the elastic portion 9b. In this way, the elastic portion 9a is considerably displaced further than the elastic portion 9b in the y axis direction which is a different direction from the x axis direction which is a displacement direction. Specifically, a displacement amount of the front end surface 98 of the elastic portion 9a in the −y axis direction was 16.8 nm and a displacement amount of the front end surface 98 of the elastic portion 9b in the −y axis direction was 8.0 nm.

As understood from the simulation results, the elastic portion 9b includes the connection surface 95 including the curved surface portion 901, and thus it is possible to reduce the vibration component in the y axis direction which is a direction other than the x axis direction which is a desired driving vibration direction. Further, it is possible to considerably reduce an unnecessary vibration component to about half of the elastic portion 9a including no "curved surface portion". Therefore, in the elastic portion 9b, it is possible to effectively reduce the increase in the quadrature signal further than the elastic portion 9a.

Even in the configuration (shape) of the elastic portion 43 included in the gyro sensor element 4 according to the embodiment, it is possible to obtain the same operational effects and advantages as those of the above-described elastic portion 9b.

Method of Manufacturing Gyro Sensor

Next, a method of manufacturing the gyro sensor according to the invention will be described. Hereinafter, an example of a case in which the above-described gyro sensor 1 is manufactured will be described.

Figure 12:
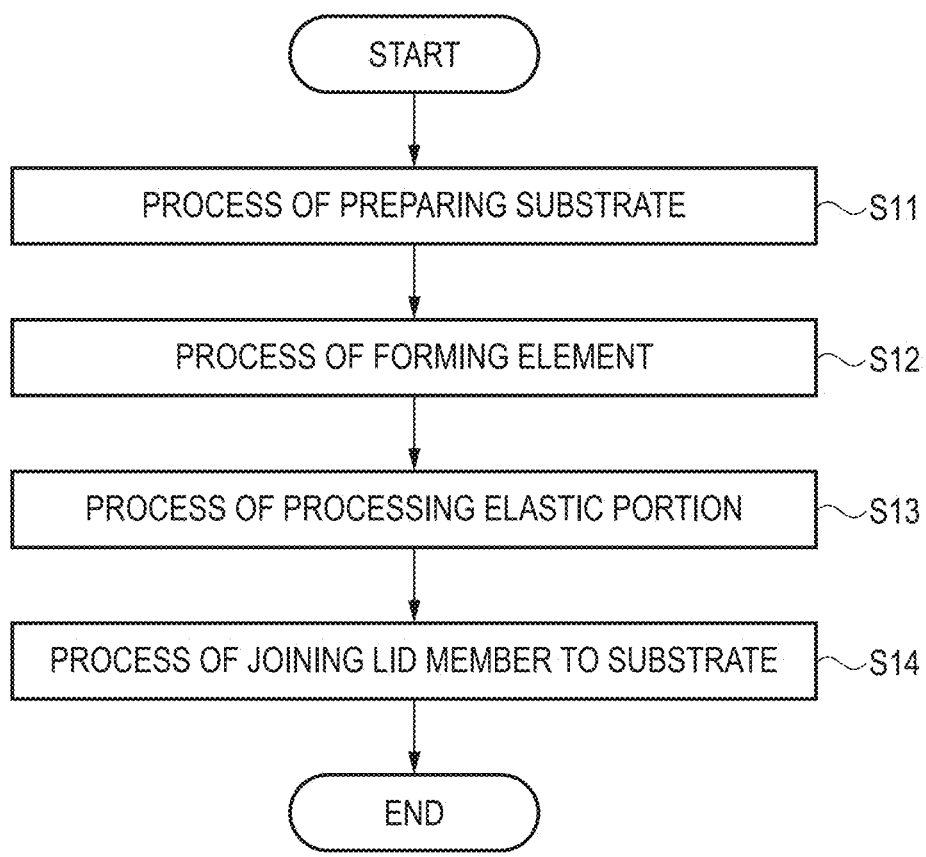
FIG. 12 is a flowchart illustrating a method of manufacturing the gyro sensor illustrated in FIG. 1.
Figure 13:
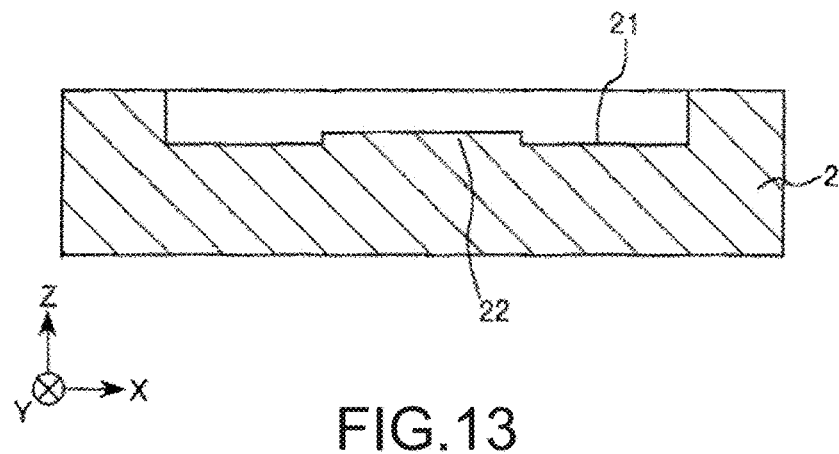
FIG. 13 is a diagram illustrating a process of preparing a substrate illustrated in FIG. 12.
Figure 14:
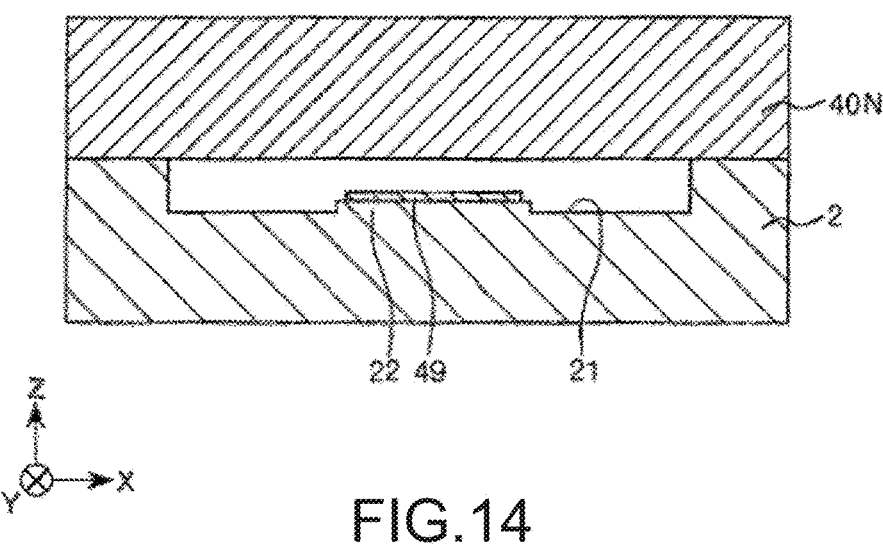
FIG. 14 is a diagram illustrating a process of forming an element illustrated in FIG. 12.
Figure 15:
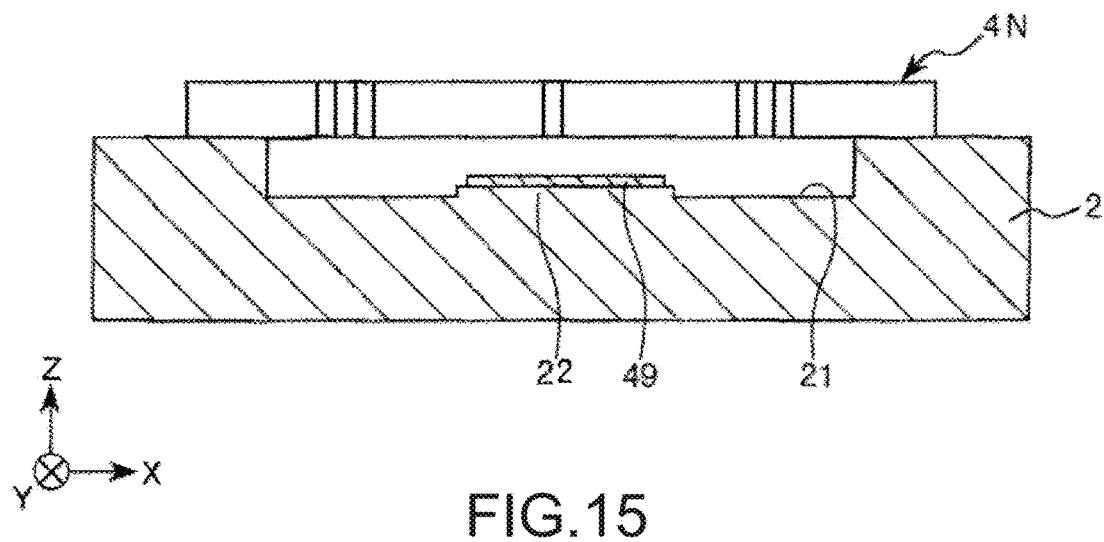
FIG. 15 is a diagram illustrating a process of forming the element illustrated in FIG. 12.
Figure 16:
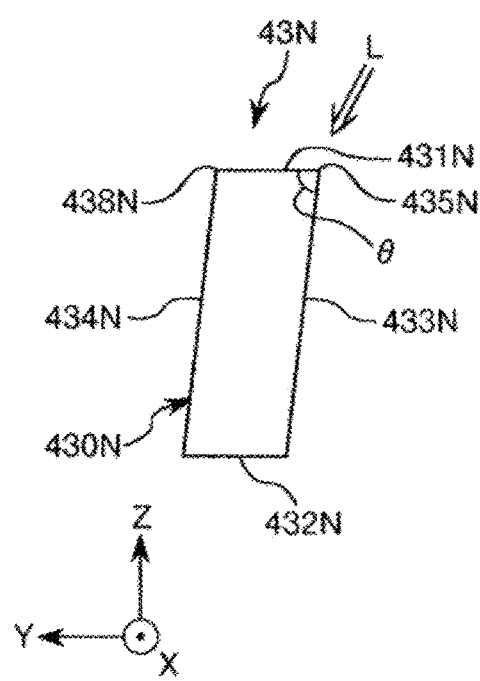
FIG. 16 is a cross-sectional view illustrating a part of the elastic portion illustrated in FIG. 4 before processing the part of the elastic portion.
Figure 17A:
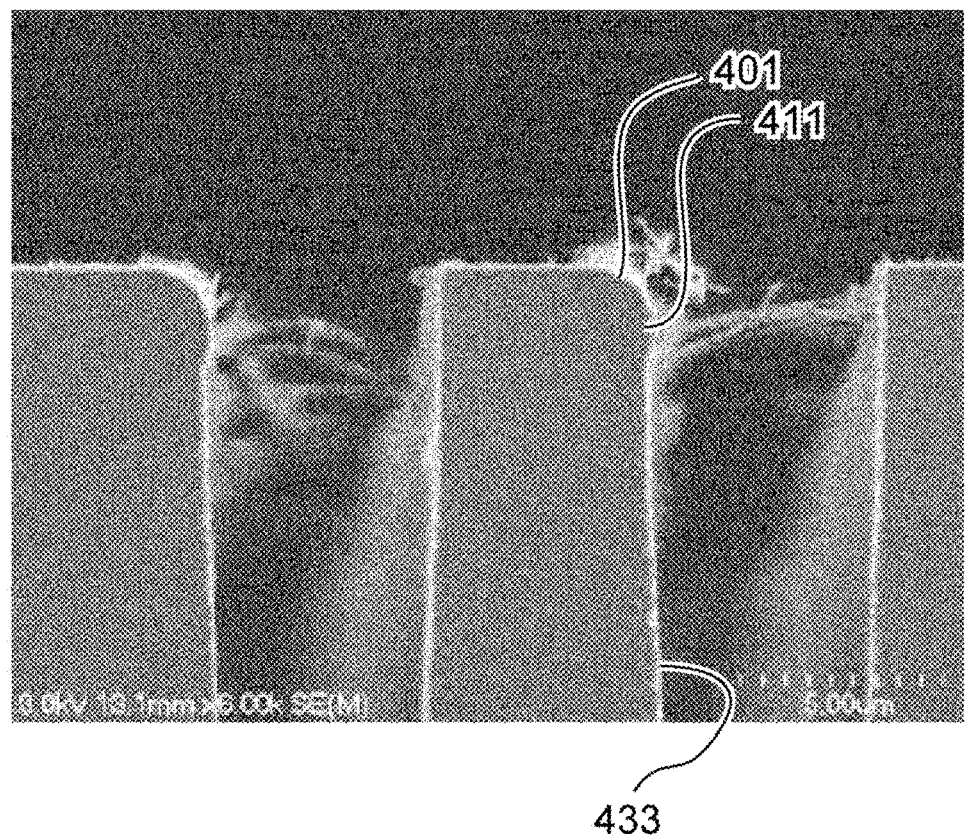
FIG. 17A is a diagram illustrating an SEM photo of a part of the elastic portion illustrated in FIG. 4
Figure 17B:
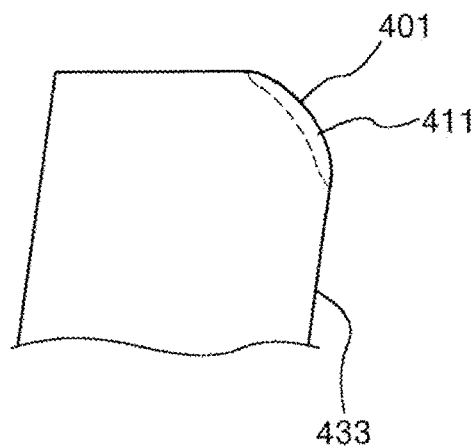
FIG. 17B is an enlarged cross-sectional view illustrating a part of the elastic portion.

FIG. 12 is a flowchart illustrating a method of manufacturing the gyro sensor illustrated in FIG. 1. FIG. 13 is a diagram illustrating a process of preparing a substrate illustrated in FIG. 12. FIGS. 14 and 15 are diagrams illustrating a process of forming the element illustrated in FIG. 12. FIG. 16 is a cross-sectional view illustrating a part of the elastic portion illustrated in FIG. 4 before processing the elastic portion. FIG. 17A is a diagram illustrating an SEM photo of a part of the elastic portion illustrated in FIG. 4 and FIG. 17B is an enlarged cross-sectional view illustrating a part of the elastic portion.

As illustrated in FIG. 12, the method of manufacturing the gyro sensor 1 includes [1] a process of preparing the substrate 2 (step S11), [2] a process of forming an element 4N (step S12), [3] a process of processing an elastic portion 43N (step S13), and [4] a process of bonding the lid member 3 to the substrate 2 (step S14). Hereinafter, the processes will be described in sequence.

Hereinafter, a case in which the substrate 2 is formed of a glass material containing alkali metal ions, the member 40N which becomes the gyro sensor element 4 is formed of a silicon material, and the lid member 3 is formed of a silicon material will be described as an example.

[1] Process of Preparing Substrate 2 (Step S11)

First, by patterning a base material with a flat plate shape by photolithography and etching, as illustrated in FIG. 13, the substrate 2 including the depression 21 is prepared.

[2] Process of Forming Element 4N (Step S12)

Subsequently, the element 4N including the mass portion 41, the plurality of fixed portions 42, the plurality of elastic portions 43N, the plurality of driving portions 44, the plurality of fixed driving portions 45 and 46, the detection portions 471 and 472, and the plurality of beam portions 48 is formed. The element 4N becomes the gyro sensor element 4 through processes to be described below and the elastic portion 43N becomes the elastic portion 43 through processes to be described below.

Specifically, the plate-shaped member 40N is first prepared and the member 40N is bonded onto the substrate 2 by, for example, an anode bonding method (see FIG. 14). Subsequently, after the member 40N is thinned, for example, by polishing the member 40N, the element 4N is formed by patterning the thinned member 40N by photolithography and etching (see FIG. 15). In the embodiment, a dry Bosch method in which an etching process using a reactive plasma gas and a deposition (stacking) process are combined is appropriately used in the etching of the member 40N. The thinning of the member 40N may be appropriately omitted.

[3] Process of Processing Elastic Portion 43N (Step S13)

Next, the elastic portion 43 that includes the connection surface 435 including the curved surface portion 401 illustrated in FIG. 6 is formed by processing the elastic portion 43N illustrated in FIG. 16.

Here, in the embodiment, the member 40N is processed through an etching process using a reactive plasma gas, as described above. In the processing of the member 40N using the reactive plasma gas, reactive plasma is generated by introducing an etching gas into a chamber in which the member 40N is disposed. Since the reactive plasma has a concentric density distribution for the member 40N, an incidence angle differs depending on the position of the member 40N. Therefore, a distribution of a vertical process precision is produced inside the member 40N. As a result, in the obtained element 4N, a processing error occurs due to the reactive plasma gas. In the embodiment, the processing error due to the reactive plasma gas has been exemplified, but a processing error or the like can also occur in accordance with another method.

A processing error or the like occurs to some extent in the element 4N obtained through the above-described processes. In the embodiment, an originally ideal cross-sectional shape is a rectangular shape and the cross-sectional shape of the elastic portion 43N obtained through the above-described processes is a parallelogram shape, as illustrated in FIG. 16. The outer circumference surface 430N of the elastic portion 43N includes one pair of first main surface 431N and second main surface 432N parallel to each other and one pair of first side surface 433N and second side surface 434N in which ends are connected and which are parallel to each other.

In the process, a first vertex portion 435N located on the top right of the elastic portion 43N with this shape (a boundary portion between the first main surface 431N and the first side surface 433N) in FIG. 16 is processed. Thus, a curved surface portion 401 is formed. The processing of the elastic portion 43N includes removing or deforming a part of the elastic portion 43N.

In the embodiment, the entire region of the first vertex portion 435N is processed. Thus, a connection surface 435 configured with the curved surface portion 401 can be formed. Here, an angle θ (interior angle) of the first vertex portion 435N is less than 90°, that is, an acute angle. A portion to be processed in the elastic portion 43N is preferably a portion in which an acute angle is formed as in the angle θ of the first vertex portion 435N. Thus, it is possible to improve the advantage of reducing an unnecessary vibration component.

The processing of the first vertex portion 435N in the embodiment is performed by radiating a laser beam L to the first vertex portion 435N from the upper side of the elastic portion 43N (see FIG. 16). In particular, it is preferable to radiate the laser beam L from an inclination direction side of the first side surface 433N. Thus, it is possible to form the connection surface 435 formed with the curved surface portion 401 with high precision.

For example, the wavelength of the laser beam L is preferably equal to or greater than 200 nm and equal to or less than 1.11 μm and more preferably equal to or greater than 260 nm and equal to or less than 1100 nm. When the wavelength of the laser beam L is within such a range, it is possible to prevent dross, debris, or the like from considerably increasing. A YAG laser is preferably used as the laser beam L. In particular, in the embodiment, the laser beam L with a second harmonic wave (532 nm) of a YAG laser of which a basic waveform is 1064 nm is appropriately used. When a waveform equal to or greater than the second harmonic wave (532 nm) of the YAG laser is applied to the elastic portion 43N formed of a silicon material, an ablation (transpiration) phenomenon is produced and thus appropriate processing can be performed.

The size of the shape (cross-sectional shape) of the laser beam L in the irradiated portion are not particularly limited. For example, the length of one side can be set to a square in which the length of one side is in the range of 1 μm to 200 μm or can be set to a circle in which a diameter is in the range of 1 μm to 300 μm. When the laser beam L is radiated to the entire region of the first vertex portion 435N as in the embodiment, the shape and the size of the laser beam L is preferably a square in which the length of one side is in the range of about 1 μm to 100 μm or can be set to a circle in which a diameter is in the range of about 1 μm to 100 μm. In particular, in the embodiment, the laser beam L that forms a circle with a diameter of about 3 μm is appropriately used.

In the portion (first vertex portion) in the curved surface portion 401 of the elastic portion 43, a degenerated portion 411 (a degenerated layer) in which a material is changed due to radiation of the laser beam is formed by using the laser beam.

In the embodiment, the laser beam with the wavelength of 532 nm which is the second harmonic wave of the YAG laser is radiated to the elastic portion 43 formed of a monocrystal silicon material at an angle of 20° to 45° with respect to a perpendicular line of the first main surface 431N at a strength of about 0.5 mJ several times. Then, the portion (the first vertex portion) in the curved surface portion 401 of the elastic portion 43 is rounded and the degenerated portion 411 protruding from the first side surface 433 in the −Y axis direction is formed (see FIGS. 6 and 17A and 17B). In the degenerated portion 411, crystallinity is considered to be changed by the laser beam L and is specifically considered to have melted and re-crystallized. By including the degenerated portion 411, it is possible to improve the advantage of reducing an unnecessary vibration component.

A method of processing the first vertex portion 435N is not limited to the above-described method of radiating the laser beam L. For example, a method of performing lamp heating by a halogen heater or the like or a method of physically removing a focused ion beam (FIB) or the like can also be used.

[4] Process of Bonding Lid Member 3 to Substrate 2 (Step S14)

Next, the lid member 3 including the depression 31 is bonded to the upper surface of the substrate 2. Thus, the space S in which the gyro sensor element 4 is accommodated is formed by the depression 21 of the substrate 2 and the depression 31 of the lid member 3, and thus the gyro sensor 1 illustrated in FIG. 2 can be obtained.

Although not illustrated, when the lid member 3 has a through hole communicating the outside and the inside of the space S, the space S is in a depressurized (vacuum) state by forming the space S, subsequently vacuumizing the space S using the through hole, and subsequently sealing the through hole.

When the plurality of gyro sensors 1 are manufactured, a dicing process may be provided after the process of processing the elastic portions (step S14).

The method of manufacturing the gyro sensor 1 which is an example of the method of manufacturing the gyro sensor according to the invention described above includes, as described above, the process of preparing the substrate 2 (step S11), the process of forming the fixed portions 42 which are fixed to the substrate 2, the driving portions 44 which are driven in the first direction oriented along the Y axis serving as the "first axis," the detection portions 471 and 472 which are displaceable in the second direction oriented along the Z axis serving as the "second axis" orthogonal to the Y axis by the Coriolis force operated on the driving portions 44, the mass portion 41 which connects the driving portions 44 to the fixed portions 42, and the elastic portions 43N in which the outer circumference surface 430N includes the first main surface 431N and the second main surface 432N serving as the "main surfaces", the first side surface 433N and the second side surface 434N serving as the "side surfaces" and which connects the mass portion 41 to the fixed portions 42 (in the embodiment, the process of forming the element 4N (step S12)), and the process of processing the elastic portion 43N (step S13). In the process of processing the elastic portion (step S13), the connection surface 435 including the curved surface portion 401 forming in the curved surface shape is formed by radiating the laser beam L to at least a part of the elastic portion 43N and connecting the first main surface 431 to the first side surface 433. According to the method of manufacturing the gyro sensor 1, the curved surface portion 401 can be formed in at least a part of the connection surface 435 simply and with high precision. Therefore, it is possible to simply manufacture the gyro sensor 1 capable of reducing the increase in the quadrature signal. As in the embodiment, the processing of the elastic portion 43N so that the entire region of the connection surface 435 becomes the curved surface portion 401 is suitable to prominently exert the above-described advantages.

Second Embodiment

Next, a second embodiment of the invention will be described.

Figure 18:
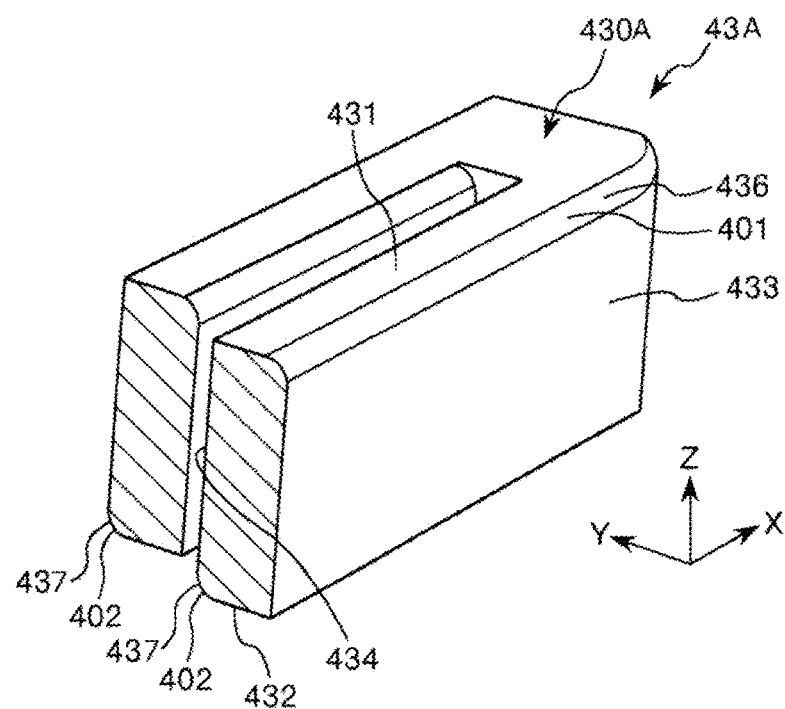
FIG. 18 is a perspective view schematically illustrating a part of an elastic portion included in a gyro sensor according to a second embodiment of the invention.
Figure 19:
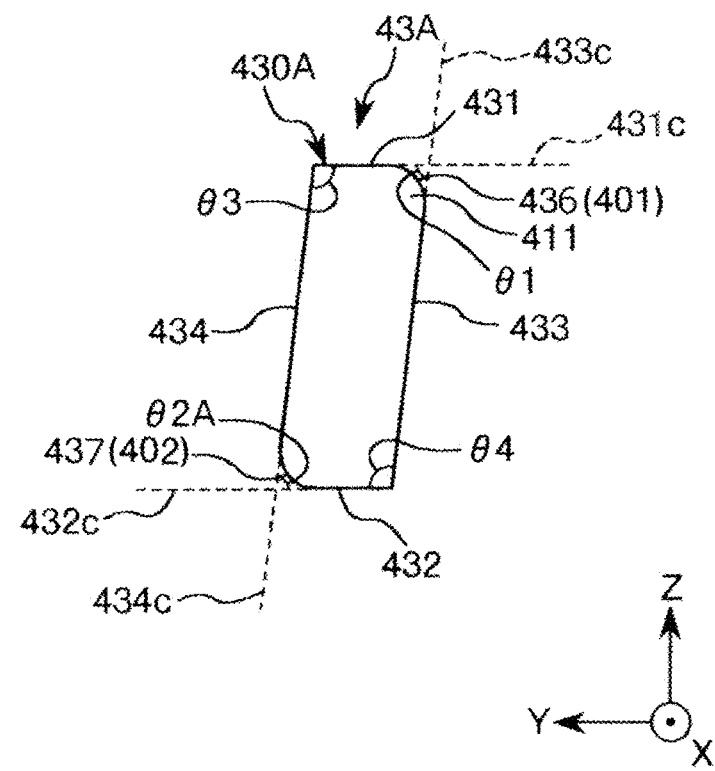
FIG. 19 is a cross-sectional view illustrating the elastic portion illustrated in FIG. 18.
Figure 20:
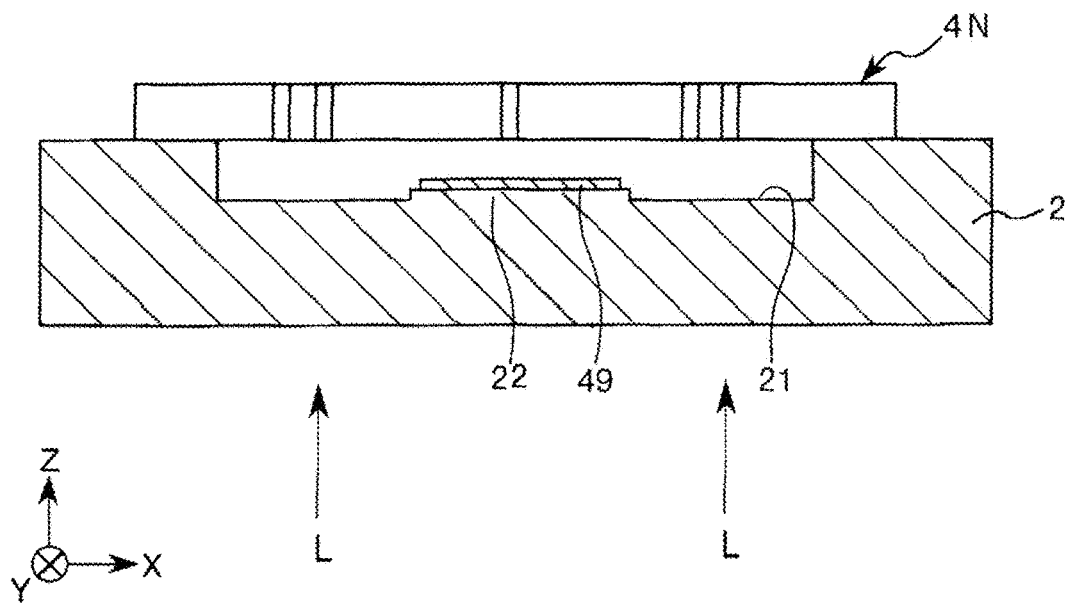
FIG. 20 is a diagram illustrating a process of processing the elastic portion illustrated in FIG. 18.
Figure 21:
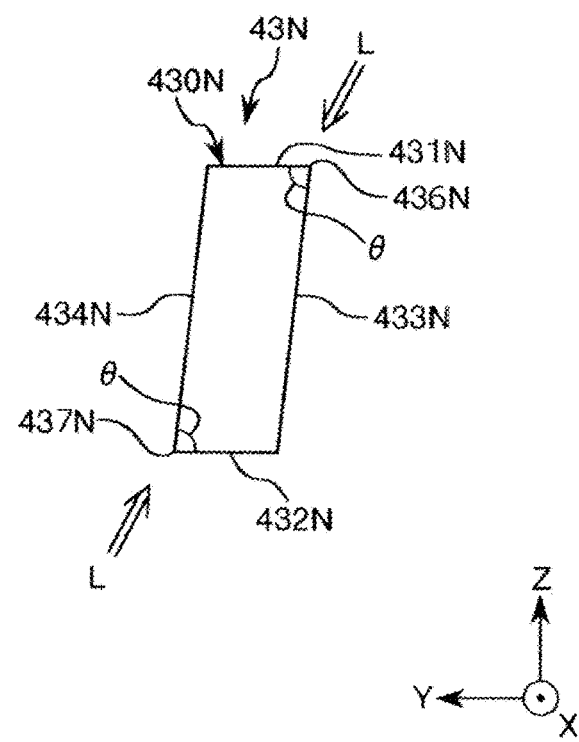
FIG. 21 is a cross-sectional view illustrating the elastic portion illustrated in FIG. 18 before the elastic portion is processed.

FIG. 18 is a perspective view schematically illustrating a part of an elastic portion included in a gyro sensor according to the second embodiment of the invention. FIG. 19 is a cross-sectional view illustrating the elastic portion illustrated in FIG. 18. FIG. 20 is a diagram illustrating a process of processing the elastic portion illustrated in FIG. 18. FIG. 21 is a cross-sectional view illustrating the elastic portion illustrated in FIG. 18 before the elastic portion is processed.

In the following description, differences between the second embodiment and the above-described embodiment will be mainly described and the same factors will not be described.

Gyro Sensor

In the embodiment, as illustrated in FIG. 18, an elastic portion 43A includes a first connection surface 436 and a second connection surface 437 as two "connection surfaces". The first connection surface 436 is the same as the connection surface 435 in the first embodiment.

The second connection surface 437 connects the side of the second main surface 432 on the +Y axis side to the side of the second side surface 434 on the −Z axis side. The second connection surface 437 has the same configuration as the first connection surface 436 (the connection surface 435). Specifically, the second connection surface 437 includes a curved surface portion 402 which is a curved surface with a convex shape as in the curved surface portion 401. In the embodiment, the entire region of the second connection surface 437 is configured as the curved surface portion 402. An angle θ2A formed between an imaginary surface 432c extending from the second main surface 432 and an imaginary surface 434c extending from the second side surface 434 is less than 90°.

The second connection surface 437 is located on the −Z axis side, that is, the side of the above-described substrate 2. The first connection surface 436 is located on the +Z axis side, that is, the side of the lid member 3.

An outer circumference surface 430A of the elastic portion 43A includes a first main surface 431 and a second main surface 432 serving as "main surfaces", a first side surface 433 and a second side surface 434 serving as "side surfaces", and a first connection surface 436 connecting the first main surface 431 to the first side surface 433 and serving as a "connection surface", and a second connection surface 437 connecting the second main surface 432 to the second side surface 434 and serving as a "connection surface". In this way, in the embodiment, there are portions in which two facing vertex portions of the elastic portion 43A having the cross-sectional shape which is a substantially parallelogram are formed in a curved surface shape. Thus, it is possible to more prominently exert the advantage of reducing the increase in the quadrature signal. In particular, in the embodiment, the entire region of the first connection surface 436 is configured as the curved surface portion 401 and the entire region of the second connection surface 437 is configured as the curved surface portion 402. Therefore, it is possible to more prominently exert the advantage of reducing the increase in the quadrature signal.

Method of Manufacturing Gyro Sensor

[3] Process of Processing Elastic Portion 43N (Step S13)

In the embodiment, the elastic portion 43N included in the element 4N is processed by radiating the laser beam L to the element 4N via the substrate 2 from the lower surface (−Z axis) side of the substrate 2 in a state in which the element 4N is disposed on the substrate 2 (see FIG. 20). Therefore, a substrate that has transparency to the laser beam L is used as the substrate 2. In the embodiment, the substrate 2 formed of a glass material is used. The wavelength of the laser beam may be determined depending on the kind of substrate 2 or the like. When the substrate 2 is formed of a glass material, the laser beam L with a wavelength which is within a range equal to or greater than 380 nm and equal to or less than 780 nm (that is, a visible light region) is preferably used.

In this process, as illustrated in FIG. 21, a first vertex portion 436N (corner portion) and a second vertex portion 437N located on the bottom left (a boundary portion between the second main surface 432N and the second side surface 434N) in FIG. 21 are processed. Thus, as illustrated in FIG. 19, the second main surface 432 and the second side surface 434 are connected along with the first connection surface 436 to form the second connection surface 437 including the curved surface portion 402.

In particular, in the embodiment, the laser beam L is radiated to the entire region of the first vertex portion 436N from the upper side of the elastic portion 43N and the laser beam L is radiated to the entire region of the second vertex portion 437N from the lower surface side of the substrate 2.

An angle θ (interior angle) of the second vertex portion 437N is less than 90°, that is, an acute angle, as in the angle θ (interior angle) of the first vertex portion 436N. In this way, by removing both of the first vertex portion 436N and the second vertex portion 437N forming the acute angle and facing each other, it is possible to particularly improve the advantage of reducing an unnecessary vibration component.

In the embodiment, as described above, the second connection surface 437 serving as the "connection surface" is formed on the side of the substrate 2 of the elastic portion 43A. Thus, even in a state in which the element 4N is disposed on the upper side of the substrate 2 which has transparency to the laser beam L, the second connection surface 437 including the curved surface portion 402 can be formed by radiating the laser beam L from the side of the substrate 2 to process a desired portion (in the embodiment, the second vertex portion 437N) on the side of the substrate 2 of the elastic portion 43N. As described above, the elastic portion 43A includes the second connection surface 437 located on the side of the substrate 2 and the first connection surface 436 located on the opposite side (the side of the lid member 3) to the second connection surface 437. Thus, it is possible to reduce the increase in a quadrature signal.

Third Embodiment

Next, a third embodiment of the invention will be described.

Figure 22:
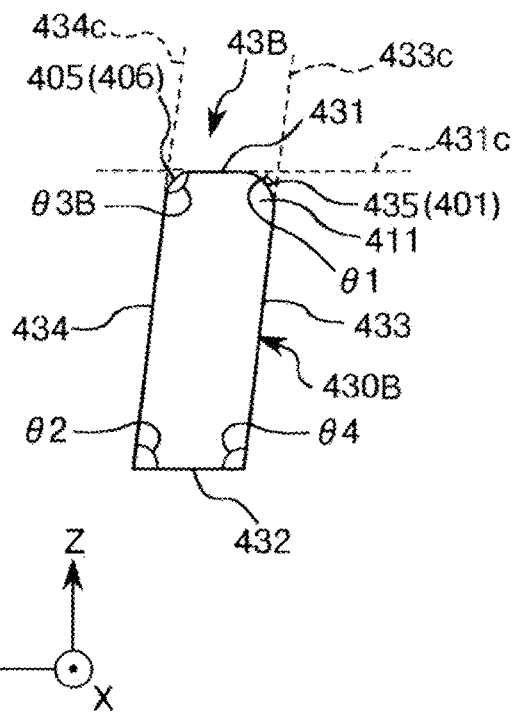
FIG. 22 is a cross-sectional view schematically illustrating a part of an elastic portion included in a gyro sensor according to a third embodiment of the invention.
Figure 23:
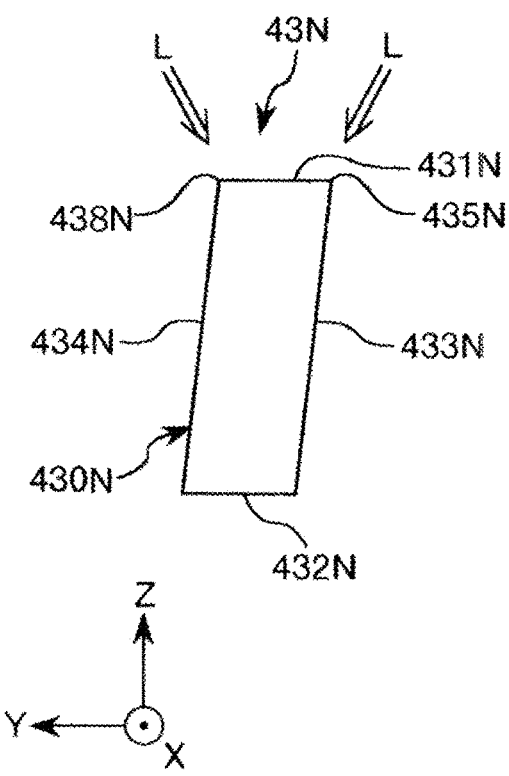
FIG. 23 is a cross-sectional view illustrating the elastic portion illustrated in FIG. 22 before processing the elastic portion.
Figure 24:
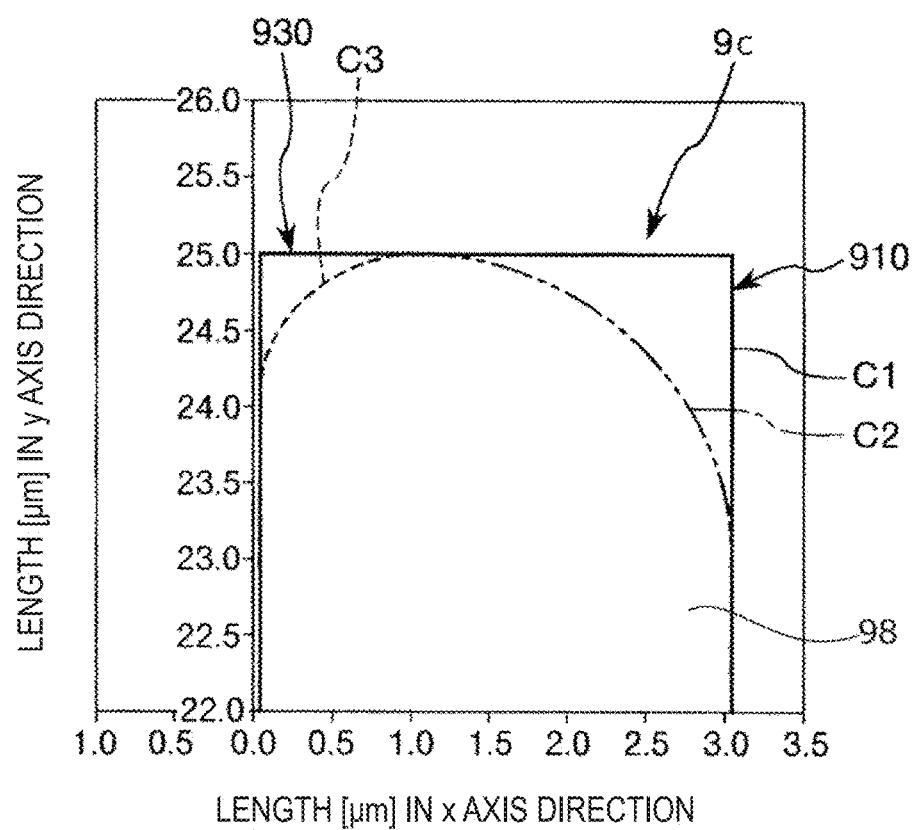
FIG. 24 is a diagram illustrating a curved surface portion included in a model of an elastic portion used in simulation.
Figure 25:
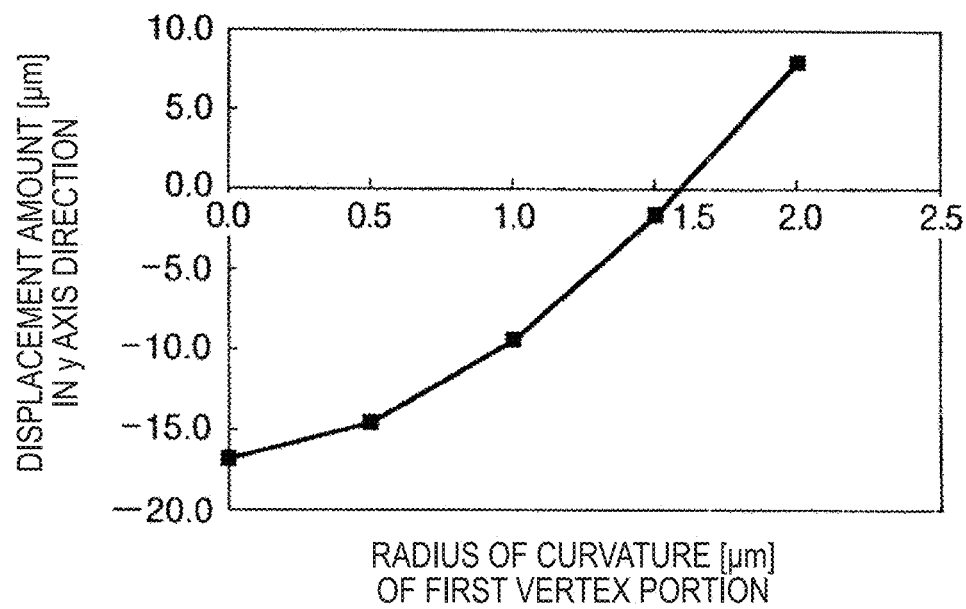
FIG. 25 is a graph illustrating a displacement amount in the Y axis direction when a first vertex portion in FIG. 24 is set as a curved surface.
Figure 26:
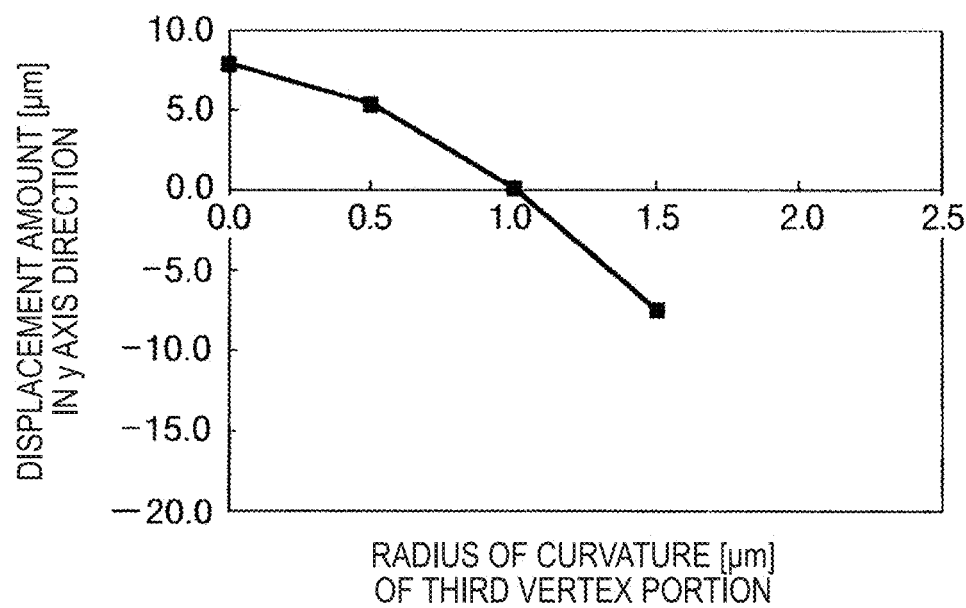
FIG. 26 is a graph illustrating a displacement amount in the Y axis direction when a third vertex portion in FIG. 24 is set as a curved surface.

FIG. 22 is a cross-sectional view schematically illustrating a part of an elastic portion included in a gyro sensor according to a third embodiment of the invention. FIG. 23 is a cross-sectional view illustrating the elastic portion illustrated in FIG. 22 before processing the elastic portion. FIG. 24 is a diagram illustrating a curved surface portion included in a model of an elastic portion used in simulation. FIG. 25 is a graph illustrating a displacement amount in the Y axis direction when a first vertex portion in FIG. 24 is set as a curved surface. FIG. 26 is a graph illustrating a displacement amount in the Y axis direction when a third vertex portion in FIG. 24 is set as a curved surface.

In the following description, differences between the third embodiment and the above-described embodiment will be mainly described and the same factors will not be described.

In the embodiment, as illustrated in FIG. 22, an elastic portion 43B includes an adjustment connection surface 405. The adjustment connection surface 405 connects the side of the first main surface 431 on the +Y axis side to the side of the second side surface 434 on the +Z axis side. The adjustment connection surface 405 has an adjustment curved surface portion 406 which is a curved surface with a convex shape. In the embodiment, the entire region of the adjustment connection surface 405 is configured as the adjustment curved surface portion 406. A radius of curvature of the adjustment curved surface portion 406 is less than a radius of curvature of the curved surface portion 401. Specifically, the radius of curvature of the adjustment curved surface portion 406 is appropriately set in accordance with the configuration, the shape, or the like of the elastic portion 43B and is not particularly limited. For example, the radius of curvature is equal to or greater than about 0.05 μm and equal to or less than about 10 μm.

The adjustment connection surface 405 including the adjustment curved surface portion 406 is a minute adjustment surface used to reduce (process) the increase in the quadrature signal because of a considerably large radius of curvature of the curved surface portion 401.

An angle θ3B formed between the imaginary surface 431c extending from the first main surface 431 and the imaginary surface 434c extending from the second side surface 434 is greater than 90°. That is, the angle θ3B is an obtuse angle.

In this way, in the embodiment, an outer circumference surface 430B of the elastic portion 43B includes the adjustment connection surface 405 which is a surface located on the opposite side to the connection surface 435 of the first main surface 431 serving as the "main surface" and connected to the first main surface 431, and at least a part of the adjustment connection surface 405 includes an adjustment curved surface portion 406 which is a curved surface that has a radius of curvature less than the curved surface portion 401 of the connection surface 435. Thus, it is possible to reduce the increase in a quadrature signal because of a considerably large radius of curvature of the curved surface portion 401. In particular, since the entire surface of the adjustment connection surface 405 is configured as the adjustment curved surface portion 406 as in the embodiment, it is possible to more prominently exert the above-described advantage.

As illustrated in FIG. 23, the elastic portion 43B can be obtained by processing a first vertex portion 435N of the elastic portion 43N and a third vertex portion 438N located on the top left (a boundary portion between the first main surface 431N and the second side surface 434N) in FIG. 23. A method using the laser beam L can be exemplified as the processing method, as in the first embodiment. For example, a method in which the number of times the laser beam L is radiated to the third vertex portion 438N is reduced than that to the first vertex portion 435N can be exemplified.

Next, the reduction (processing) of the increase in the quadrature signal because of the considerably large radius of curvature of the curved surface portion 401 since the elastic portion 43B includes the adjustment connection surface 405 including the adjustment curved surface portion 406, as described above, will be described based on the following simulation result.

An elastic portion 9c that has the same configuration as the elastic portion 9 in the first embodiment was used as a model used in the simulation. FIG. 24 illustrates the +Y axis side of a front end surface 98 of the elastic portion 9c.

When a state in which a radius of curvature [μm] of a first vertex portion 910 located on the top right of the elastic portion 9c in the drawing is indicated by a line segment C1 (solid line) is changed to a state indicated by a line segment C2 (two-dot chain line), as illustrated in FIG. 24, a displacement amount [μm] of the front end surface 98 in the −y axis direction (a direction other than a desired displacement direction) decreases, as illustrated in FIG. 25. In this way, as the radius of curvature of the first vertex portion 910 increases, a displacement amount in the −y axis direction decreases to be close to 0 (zero). However, as illustrated in FIG. 25, when the radius of curvature of the first vertex portion 910 is considerably large, displacement in the +y axis direction occurs. Thus, as the radius of curvature of the first vertex portion 910 increases, the displacement in the +y axis direction increases.

Accordingly, when the radius of curvature of the first vertex portion 910 remains to be 2.0 [μm] and a radius of curvature [μm] of a third vertex portion 930 located in the top left of the elastic portion 9c in the drawing is changed from a state indicated by the line segment C1 (solid line) to a state indicated by a line segment C3 (dotted line), as illustrated in FIG. 24, the displacement amount [μm] of the front end surface 98 in the +y axis direction decreases, as illustrated in FIG. 26. In this way, as the radius of curvature of the third vertex portion 930 increases, a displacement amount in the +y axis direction decreases to be close to 0 (zero).

As understood from the simulation results, it is possible to reduce (process) the increase in a quadrature signal because of the considerably large radius of curvature of the first vertex portion 910 by processing the third vertex portion 930 including the elastic portion 9c to the curved surface shape. Accordingly, when a vibration component (an unnecessary vibration component) in a direction other than a desired driving vibration direction increases because of the considerably large radius of curvature of the curved surface portion 401 described above, it can be understood that the increase in the unnecessary vibration component is reduced by forming the adjustment curved surface portion 406.

Fourth Embodiment

Next, a fourth embodiment of the invention will be described.

Figure 27:
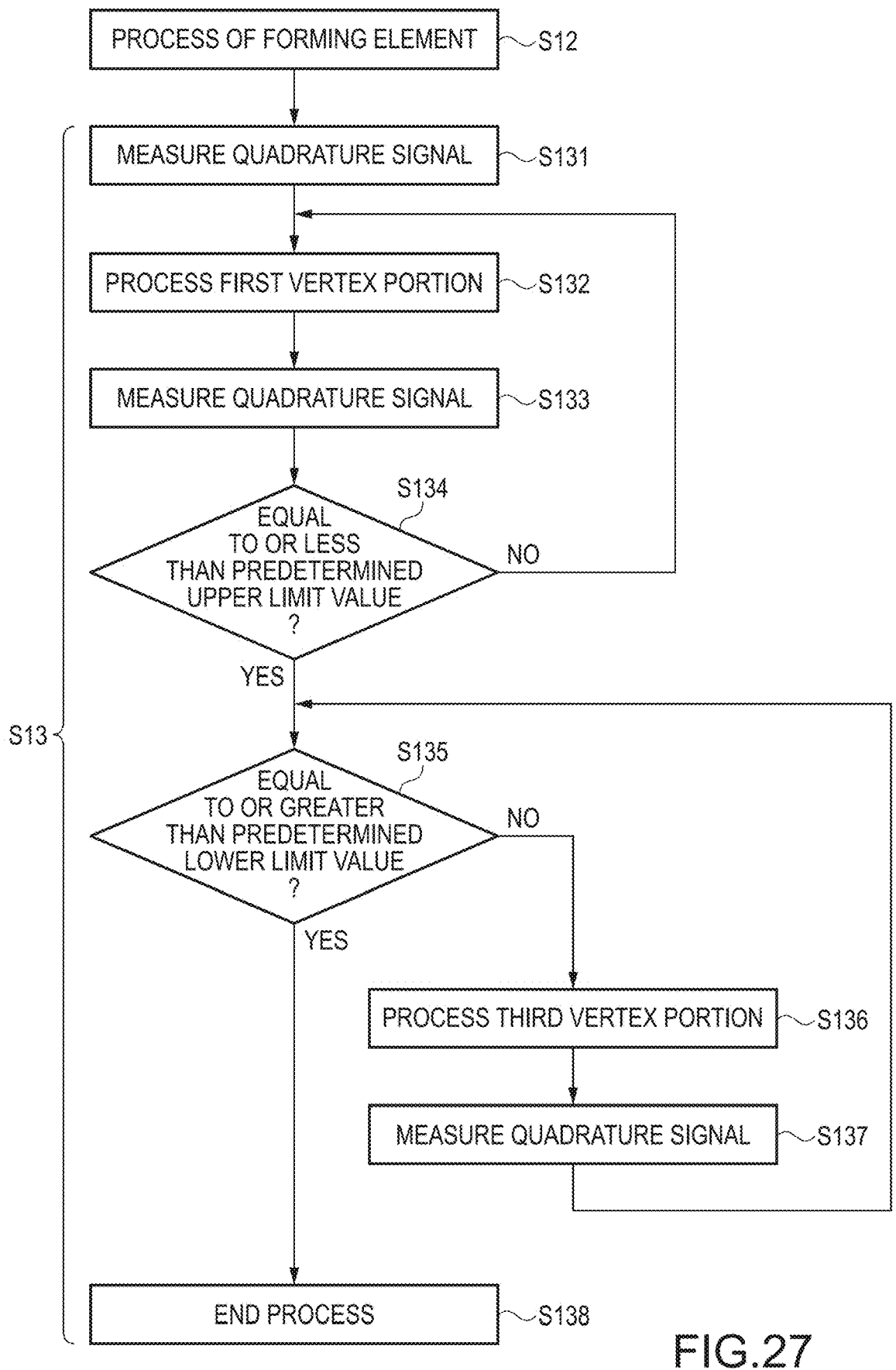
FIG. 27 is a flowchart illustrating a method of manufacturing a gyro sensor according to a fourth embodiment of the invention.
Figure 28:
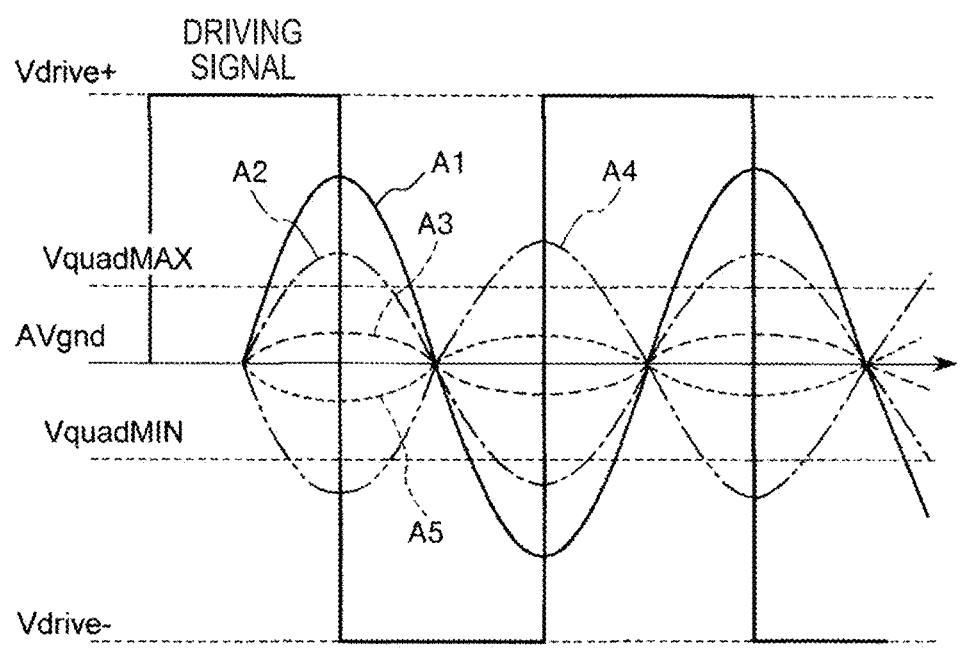
FIG. 28 is a conceptual diagram illustrating measurement of a quadrature signal.

FIG. 27 is a flowchart illustrating a method of manufacturing a gyro sensor according to a fourth embodiment of the invention. FIG. 28 is a conceptual diagram illustrating measurement of a quadrature signal.

In the following description, differences between the fourth embodiment and the above-described embodiment will be mainly described and the same factors will not be described.

Method of Manufacturing Gyro Sensor

[3] Process of Processing Elastic Portion 43N (Step S13)

In the embodiment, the elastic portion 43N is processed while measuring a quadrature signal (quadrature signal component). In the embodiment, a case in which the elastic portion 43N is processed and the elastic portion 43B in the above-described third embodiment is manufactured will be described.

Specifically, first, after the element 4N is formed in the process of forming the element 4N (step S12 in FIG. 27), a quadrature signal is first measured in the process of processing the elastic portion (step S13) (step S131 in FIG. 27). The measurement of the quadrature signal is performed by applying a driving voltage to the gyro sensor 1 for the driving vibration of the driving portion 44 and detecting displacement (detecting vibration) of the detection portions 471 and 472 in a state in which the angular velocity ωx is not applied to the gyro sensor 1 (reference state) (see FIG. 3). In the measurement of step S131, as indicated by a line segment A1 in FIG. 28, a detection signal including a relatively high quadrature signal can be obtained before the elastic portion 43N is processed.

Subsequently, the first vertex portion 435N is processed (step S132 in FIG. 27: see FIG. 23). Thereafter, the quadrature signal is measured (step S133 in FIG. 27). Then, it is determined whether the quadrature signal is equal to or less than a predetermined upper limit value (step S134 in FIG. 27).

When it is determined in step S134 that the quadrature signal is not equal to or less than the predetermined upper limit value, the first vertex portion 435N is processed again (step S132 in FIG. 27). Here, the state in which the quadrature signal is not equal to or less than the predetermined upper limit value refers to a state in which a detection signal including the quadrature signal exceeds a predetermined upper limit value (VquadMAX), as indicated by a line segment A2 in FIG. 28.

Conversely, when it is determined in step S134 that the quadrature signal is equal to or less than the predetermined upper limit value, it is subsequently determined whether the quadrature signal is equal to or greater than a predetermined lower limit value (step S135 in FIG. 27). Here, the state in which the quadrature signal is equal to or less than the predetermined upper limit value refers to a state in which the detection signal including the quadrature signal is equal to or less than the predetermined upper limit value (VquadMAX), as indicated by a line segment A3 in FIG. 28.

When it is determined in step S135 that the quadrature signal is not equal to or greater than the predetermined lower limit value, the third vertex portion 438N is processed (step S136 in FIG. 27: see FIG. 23). Here, the state in which the quadrature signal is not equal to or greater than the predetermined lower limit value refers to a state in which the detection signal including the quadrature signal is less than the predetermined lower limit value (VquadMIN), as indicated by a line segment A4 of FIG. 28. This is caused since the first vertex portion 435N is considerably processed and the radius of curvature of the curved surface portion 401 increases.

Subsequently, after the third vertex portion 438N is processed in step S136, a quadrature signal is measured (step S137 in FIG. 27). Then, it is determined again whether the quadrature signal is equal to or greater than the predetermined lower limit value (step S135 in FIG. 27).

Conversely, when it is determined in step S135 that the quadrature signal is equal to or greater than the predetermined lower limit value, the processing of the elastic portion 43N ends (step S138 in FIG. 27). Thus, it is possible to obtain the elastic portion 43B in the above-described third embodiment (see FIG. 22). Here, the state in which the quadrature signal is equal to or greater than the predetermined lower limit value refers to a state in which the detection signal including the quadrature signal is equal to or greater than the predetermined lower limit value (VquadMIN), as indicated by a line segment A5 of FIG. 28.

In this way, according to the method of manufacturing the gyro sensor 1 in the embodiment, the quadrature signal is measured (detected) in the process of processing the elastic portion (step S13). In this way, in this process, the elastic portion 43N is processed while measuring (detecting) the quadrature signal. Thus, by forming the curved surface portion 401 based on the measured (detected) quadrature signal and forming the adjustment curved surface portion 406 as necessary, it is possible to obtain the gyro sensor 1 capable of reducing the increase in the quadrature signal with higher precision.

In the process of processing the elastic portion (step S13), a processing amount of the elastic portion 43N is adjusted based on a measurement result of the quadrature signal. Specifically, for example, as described above, the quadrature signal is measured in step S133 and whether the elastic portion is processed again in step S134 is determined based on the measurement result. Thus, it is possible to form the curved surface portion 401 capable of appropriately exerting the advantage of reducing the increase in the quadrature signal with higher precision.

Fifth Embodiment

Next, a fifth embodiment of the invention will be described.

Figure 29:
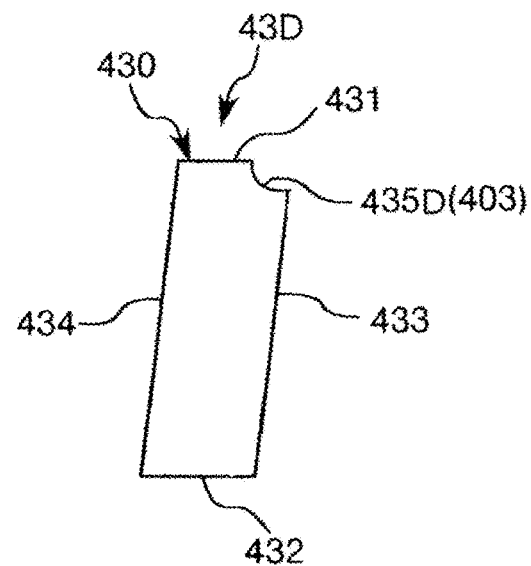
FIG. 29 is a cross-sectional diagram schematically illustrating a part of an elastic portion included in a gyro sensor according to a fifth embodiment of the invention.
Figure 30:
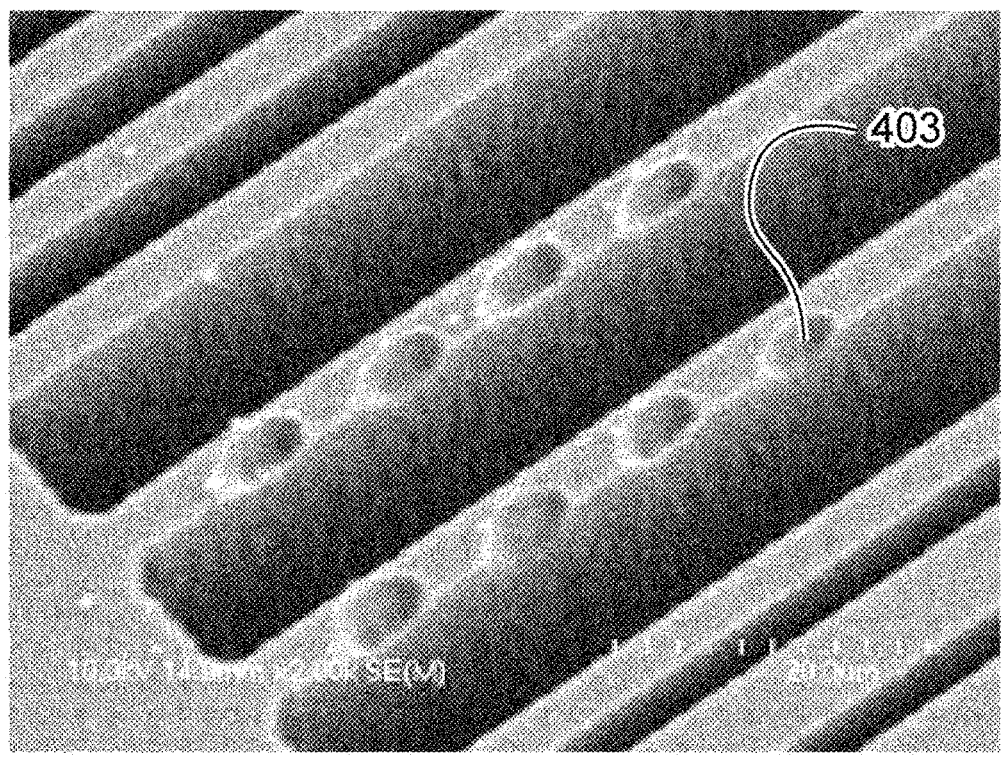
FIG. 30 is a diagram illustrating an SEM photo of a part of the elastic portion illustrated in FIG. 29.

FIG. 29 is a cross-sectional diagram schematically illustrating a part of an elastic portion included in a gyro sensor according to the fifth embodiment of the invention. FIG. 30 is a diagram illustrating an SEM photo of a part of the elastic portion illustrated in FIG. 29.

In the following description, differences between the fifth embodiment and the above-described embodiment will be mainly described and the same factors will not be described.

In the embodiment, as illustrated in FIGS. 29 and 30, a connection surface 435D included in the elastic portion 43D includes a plurality of curved surface portions 403. The curved surface portions 403 are curved surfaces in a concave state and are formed to be separated from each other.

In this way, in the embodiment, the connection surface 435D includes the plurality of curved surface portions 403 and the plurality of curved surface portions 403 are separated from each other. Even in this configuration, it is possible to prominently exert the advantage of reducing the increase in the quadrature signal to the same degree as the configuration in which the entire region of the connection surface 435 is configured as the curved surface portion 401 in the above-described first embodiment. In particular, the radius of curvature of the curved surface portion 403 is preferably greater than the radius of curvature of the curved surface portion 401 in the above-described first embodiment. Thus, it is possible to more prominently exert the above-described advantage.

When the laser beam L is used in the process of processing the elastic portion (step S13) in the manufacturing of the gyro sensor 1, the size of the laser beam L is preferably less than the size of the laser beam L at the time of forming the curved surface portion 401 in the above-described first embodiment. Specifically, the laser beam L preferably has a square of which the length of one side is in the range of about 1 μm to 10 μm or a circle in which a diameter is in the range of about 1 μm to 10 μm. In particular, in the embodiment, the laser beam L having a circle with a diameter of about 8 μm is appropriately used. Thus, it is possible to easily and appropriately form the curved surface portion 403 having the radius of curvature less than the radius of curvature of the curved surface portion 401 in the first embodiment.

2. Electronic Apparatus

Next, an electronic apparatus according to the invention will be described.

Figure 31:
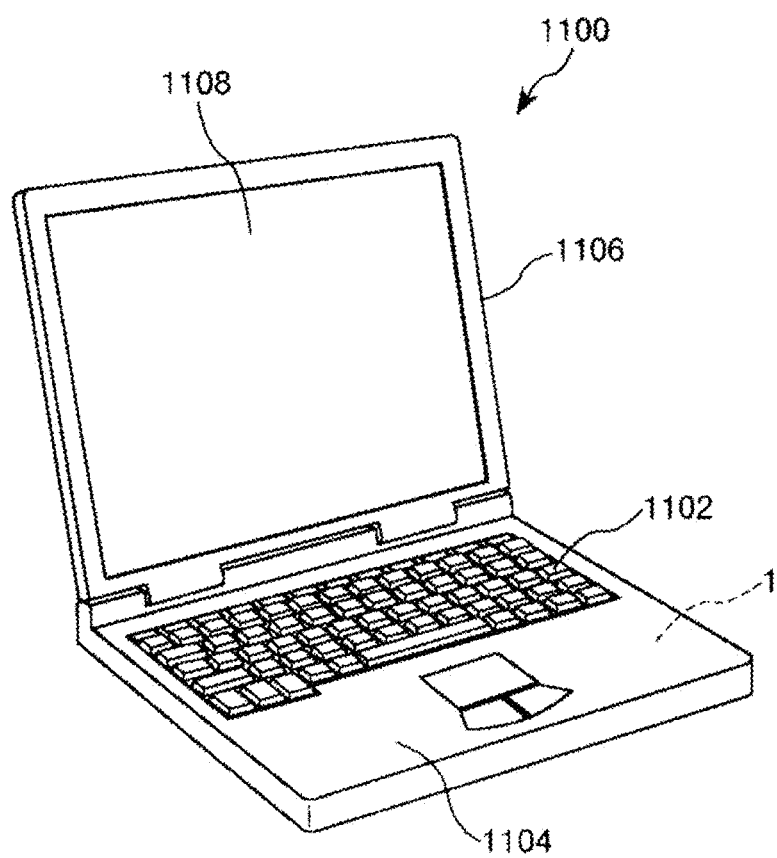
FIG. 31 is a perspective view illustrating a configuration of a mobile type (or notebook type) personal computer to which an electronic apparatus according to the invention is applied.

FIG. 31 is a perspective view illustrating a configuration of a mobile type (or notebook type) personal computer to which an electronic apparatus according to the invention is applied. In this drawing, a personal computer 1100 is configured to include a body unit 1104 including a keyboard 1102 and a display unit 1106 including a display unit 1108, and the display unit 1106 is supported to be rotatable via a hinge structure with respect to the body unit 1104. The personal computer 1100 contains the gyro sensor 1.

Figure 32:
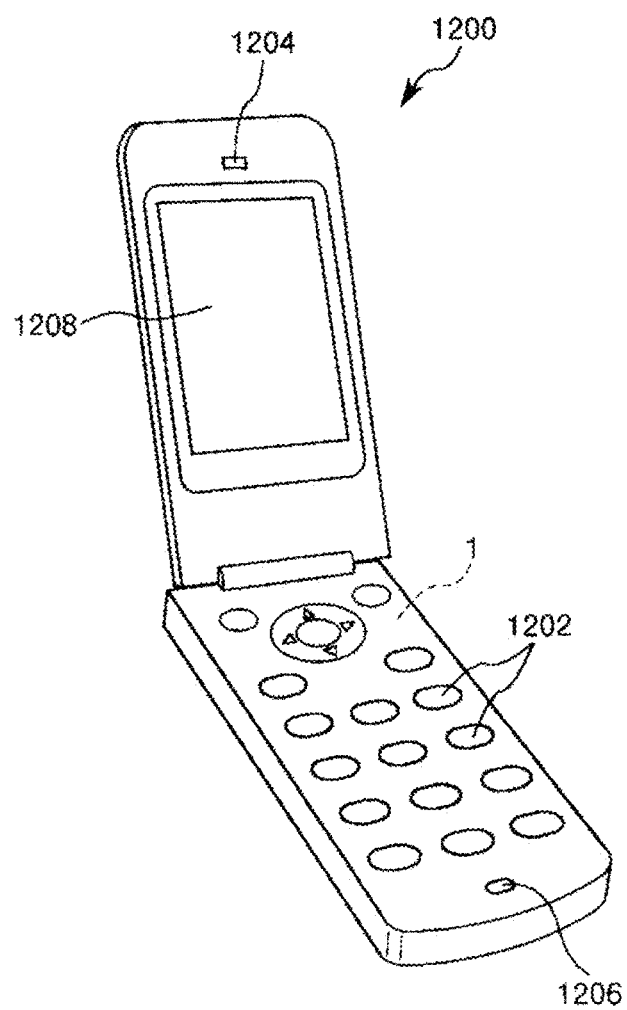
FIG. 32 is a perspective view illustrating a configuration of a mobile phone (including a smartphone, a PHS, or the like) to which an electronic apparatus according to the invention is applied.

FIG. 32 is a perspective view illustrating a configuration of a mobile phone (including a smartphone, a PHS, or the like) to which an electronic apparatus according to the invention is applied. In this drawing, a mobile phone 1200 includes an antenna (not illustrated), a plurality of operation buttons 1202, an ear piece 1204, and a mouth piece 1206. A display unit 1208 is disposed between the operation buttons 1202 and the ear piece 1204. The mobile phone 1200 contains the gyro sensor 1.

Figure 33:
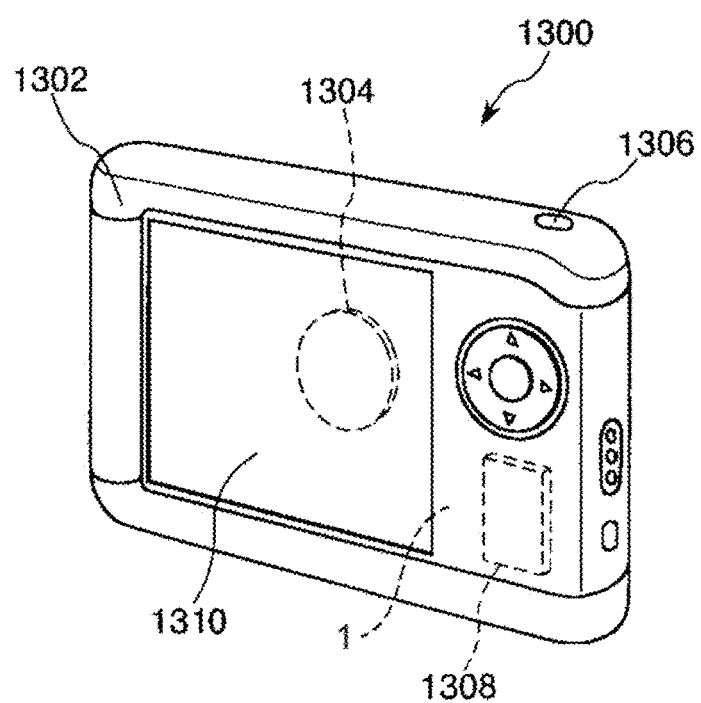
FIG. 33 is a perspective view illustrating a configuration of a digital still camera to which an electronic apparatus according to the invention is applied.

FIG. 33 is a perspective view illustrating a configuration of a digital still camera to which an electronic apparatus according to the invention is applied. In this drawing, a display unit 1310 is installed on the rear surface of a case (body) 1302 of a digital still camera 1300 and is configured to perform display based on an imaging signal by a CCD. The display unit 1310 functions as a finder that displays a subject as an electronic image. A light-receiving unit 1304 including an optical lens (imaging optical system) or a CCD is installed on the front surface side (the rear surface side in the drawing) of the case 1302. When a photographer confirms a subject image displayed on the display unit 1310 and presses a shutter button 1306, an imaging signal of the CCD at that time point is transmitted and stored in a memory 1308. The digital still camera 1300 contains the gyro sensor 1.

Such an electronic apparatus includes the above-described gyro sensor 1. Therefore the operational effects and advantages of the above-described gyro sensor 1 can be obtained, and thus reliability is high.

3. Vehicle

Next, a vehicle according to the invention will be described.

Figure 34:
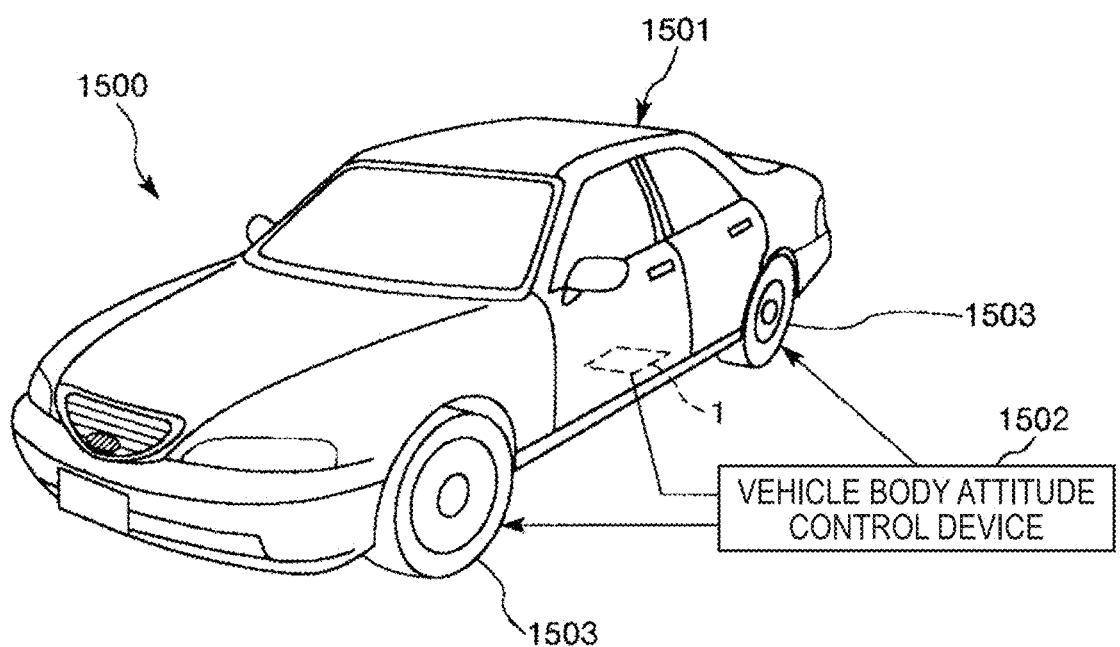
FIG. 34 is a perspective view illustrating an automobile to which a vehicle according to the invention is applied.

FIG. 34 is a perspective view illustrating an automobile to which a vehicle according to the invention is applied. In this drawing, an automobile 1500 contains the gyro sensor 1. For example, an attitude of an automobile body 1501 can be detected by the gyro sensor 1. A signal detected by the gyro sensor 1 is supplied to a vehicle body attitude control device 1502. Then the vehicle body attitude control device 1502 can detect an attitude of the automobile body 1501 based on the signal and control hardness of a suspension or control a brake of an individual wheel 1503 according to a detection result.

The vehicle includes the above-described gyro sensor 1. Therefore, it is possible to obtain the above-described operational effects and advantages of the gyro sensor 1, and thus reliability is high.

The gyro sensor 1 can be widely applied additionally to a remote handset, an immobilizer, a car navigation system, a car air conditioner, an antilock brake system (ABS), an air bag, a tire pressure monitoring system (TPMS), an engine control, and an electronic control unit (ECU) such as a fuel cell monitor of a hybrid automobile or an electronic automobile.

The gyro sensor, the method of manufacturing the gyro sensor, the electronic apparatus, and the vehicle according to the invention have been described above according to the illustrated embodiments, but the invention is not limited thereto. The configurations of the units can be substituted with any configurations with the same functions. Any other constituents may be added to the invention. The embodiments may be appropriately combined.

The entire disclosure of Japanese Patent Application No. 2016-209991, filed Oct. 26, 2016 is expressly incorporated by reference herein.

What is claimed is:

1. A gyro sensor comprising:
 a substrate;
 a fixed portion that is fixed to the substrate;

a driving portion that is driven in a first direction oriented along a first axis;

a mass portion that is connected to the driving portion and is displaced in the first direction; and an elastic portion that is connected to the mass portion and the fixed portion, wherein the mass portion includes a detection portion that is displaceable in a second direction by a Coriolis force, wherein the second direction is oriented along a second axis orthogonal to the first axis, wherein an outer circumference surface of the elastic portion includes at least one main surface, at least one side surface, and at least one connection surface connecting the at least one main surface to the at least one side surface, and wherein the connection surface has a curved surface portion with a curved surface shape.

2. The gyro sensor according to claim 1, wherein in a cross-sectional view, an angle formed by an extension line oriented along the at least one main surface connected by the at least one connection surface of the portion and an extension line oriented along the at least one side surface is less than 90°.

3. An electronic apparatus comprising:
the gyro sensor according to claim 2.

4. A vehicle comprising:
the gyro sensor according to claim 2.

5. The gyro sensor according to claim 1, wherein the at least one connection surface includes a plurality of curved surface portions, and wherein the plurality of curved surface portions are separated from each other.

6. The gyro sensor according to claim 1, wherein the elastic portion is formed from the substrate, and the at least one connection surface is provided on a side of the substrate of the elastic portion.

7. The gyro sensor according to claim 1, wherein the outer circumference surface of the elastic portion includes first and second main surfaces, first and second side surfaces, a first connection surface connecting the first main surface to the first side surface, and a second connection surface connecting the second main surface to the second side surface.

8. The gyro sensor according to claim 1, wherein the at least one main surface is connected to a first side surface by a first connection surface, wherein the at least one main surface is connected to a second side surface by a second connection surface, and wherein the second connection surface has a radius of curvature less than a radius of curvature of the first connection surface.

9. An electronic apparatus comprising:
the gyro sensor according to claim 1.

10. A vehicle comprising:
the gyro sensor according to claim 1.

11. A method of manufacturing a gyro sensor, comprising:
providing a substrate;

forming a fixed portion fixed to the substrate, a driving portion driven in a first direction oriented along a first axis, a detection portion displaceable in a second direction by a Coriolis force, wherein the second direction is oriented along a second axis orthogonal to the first axis, a mass portion connecting the driving portion to the fixed portion, and an elastic portion including at least one main surface and at least one side surface and connected to the mass portion and the fixed portion; and processing the elastic portion, wherein in the processing of the elastic portion, at least one connection surface connecting the at least one main surface to the at least one side surface and including at least one curved surface portion with a curved surface shape is formed by radiating a laser beam to at least a part of the elastic portion.

12. The method of manufacturing the gyro sensor according to claim 11, wherein in the processing of the elastic portion, a quadrature signal is measured.

13. The method of manufacturing the gyro sensor according to claim 12, wherein in the processing of the elastic portion, a radius of curvature of the at least one connection surface of the elastic portion is adjusted based on a measurement result of the quadrature signal.

* * * * *